United States Patent
Woodgate et al.

(10) Patent No.: US 7,471,352 B2
(45) Date of Patent: Dec. 30, 2008

(54) DIRECTIONAL DISPLAY APPARATUS

(75) Inventors: Graham John Woodgate, Henley-on-Thames (GB); Jonathan Harrold, Warwick (GB)

(73) Assignee: AU Optronics Corp., Hsinchu (TW)

( * ) Notice: Subject to any disclaimer, the term of this patent is extended or adjusted under 35 U.S.C. 154(b) by 286 days.

(21) Appl. No.: 10/563,117

(22) PCT Filed: Jul. 9, 2004

(86) PCT No.: PCT/GB2004/003000

§ 371 (c)(1),
(2), (4) Date: Jan. 3, 2006

(87) PCT Pub. No.: WO2005/006056

PCT Pub. Date: Jan. 20, 2005

(65) Prior Publication Data

US 2007/0109400 A1     May 17, 2007

(51) Int. Cl.
*G02F 1/1335* (2006.01)
(52) U.S. Cl. ...................................... 349/57
(58) Field of Classification Search ............... None
See application file for complete search history.

(56) References Cited

U.S. PATENT DOCUMENTS

| | | | |
|---|---|---|---|
| 4,959,641 A | 9/1990 | Bass et al. | |
| 6,016,181 A * | 1/2000 | Shimada | 349/156 |
| 6,069,650 A | 5/2000 | Battersby | |
| 6,099,786 A * | 8/2000 | Hu et al. | 264/400 |
| 6,233,027 B1 * | 5/2001 | Unno et al. | 349/25 |

(Continued)

FOREIGN PATENT DOCUMENTS

EP     0 829 744 A2     3/1898

(Continued)

OTHER PUBLICATIONS

U.S. Appl. No. 10/544,257, filed Sep. 16, 2005, Graham John Woodgate et al.

(Continued)

*Primary Examiner*—Frank G Font
*Assistant Examiner*—Eric Wong
(74) *Attorney, Agent, or Firm*—Thomas, Kayden, Horstemeyer & Risley

(57) ABSTRACT

A birefringent lens structure comprises a birefringent lens array capable of directing light of a given polarisation into a directional distribution, the birefringent lens comprising a solid birefringent material and an isotropic material having an interface having a refractive structure. A switchable liquid crystal layer capable of rotating the polarisation of light passing therethrough is arranged adjacent the first birefringent material. The interface between the birefringent material and the liquid crystal layer has an alignment microstructure providing alignment of the birefringent material and the liquid crystal layer. A pair of electrodes for applying an electric field to switch the liquid crystal are arranged with both the lens array and the switchable liquid crystal layer therebetween and a conductive material is incorporated in the lens array to reduce the voltage drop across the lens array. To reduce reflection, the interface between the birefringent material and the isotropic material has an interface having alignment microstructure providing alignment of the birefringent material, and the refractive index of the isotropic material is substantially equal to the extraordinary refractive index of the birefringent material.

2 Claims, 11 Drawing Sheets

U.S. PATENT DOCUMENTS

| | | |
|---|---|---|
| 6,535,256 B1 | 3/2003 | Ishihara et al. |
| 7,046,326 B2 * | 5/2006 | Austin et al. ................ 349/155 |
| 2003/0071948 A1 * | 4/2003 | Felder et al. ................ 349/122 |
| 2003/0128327 A1 * | 7/2003 | Noiri ........................... 349/156 |
| 2003/0214623 A1 * | 11/2003 | Ebisu et al. ................. 349/156 |
| 2005/0042391 A1 * | 2/2005 | Ryan et al. ................... 428/1.1 |
| 2007/0035829 A1 * | 2/2007 | Woodgate et al. ........... 359/462 |

FOREIGN PATENT DOCUMENTS

| | | |
|---|---|---|
| EP | 0 833 183 A1 | 4/1998 |
| JP | 2000-162435 | 6/2000 |
| JP | 2001-77203 | 3/2001 |
| WO | WO 98/21620 | 5/1998 |
| WO | WO 03/015424 A2 | 2/2003 |

OTHER PUBLICATIONS

Berkel, Cees Van et al, "Multiview 3D-LCD", Proc of SPIE, vol. 2653, 1996, pp. 32-39.

Eichenlaub, Jesse B., "Developments in Autostereoscopic Technology at Dimension Technologies Inc.", Proc of SPIE, vol. 1915, 1993, pp. 177-186.

LG Commander et al., "Electrode Designs for Tunable Microlenses", Micolens Arrays, EOS Topical Meeting, 1997, vol. 13, pp. 48-58.

Okoshi, T., "Three—Dimensional Imaging Techniques", Academic Press, 1976.

Suyama, S. et al., "3-D Display System with Dual-Frequency Liquid-Crystal Varifocal Lens", SID 97 Digest, pp. 273-276.

* cited by examiner

DIRECTIONAL DISPLAY APPARATUS

The present invention relates to directional display apparatuses and their fabrication.

Such an apparatus may be a switchable two dimensional (2D)/three dimensional (3D) autostereoscopic display apparatus; a switchable high brightness reflective display system; or a multi-user display system. Such systems may be used in computer monitors, telecommunications handsets, digital cameras, laptop and desktop computers, games apparatuses, automotive and other mobile display applications.

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2.

FIG. 2a shows a display device 16 with an attached parallax optical element 17. The display device produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display device 16 produces a left eye image 26 for the left eye channel. The parallax optical element 17 directs light in a direction shown by the arrow 28 to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display device 16,17 in a display plane 34 producing the left eye viewing windows 36,37,38 and right eye viewing windows 39,40,41 in the window plane 42. The separation of the window plane from the display is termed the nominal viewing distance 43. The windows 37,40 in the central position with respect to the display are in the zeroth lobe 44. Windows 36,39 to the right of the zeroth lobe 44 are in the +1 lobe 46, while windows 38,41 to the left of the zeroth lobe are in the −1 lobe 48.

The viewing window plane of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width.

If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealized windows in FIG. 4a. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 4b shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The quality of the separation of images and the extent of the lateral and longitudinal viewing freedom of the display is determined by the window quality, as illustrated in FIG. 4.

FIG. 4a shows the ideal viewing windows while FIG. 4b is a schematic of the actual viewing windows that may be outputted from the display. Several artifacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. The optical system is designed to optimised the performance of the viewing windows.

The parallax element may be a parallax barrier comprising an array of opaque regions alternating with transmissive regions. Parallax barriers rely on blocking the light from regions of the display and therefore reduce the brightness and device efficiency, generally to approximately 20-40% of the original display brightness. Parallax barriers are not readily removed and replaced due to the requirements of sub-pixel alignment tolerances of the barrier with respect to the pixel structure of the display in order to optimise the viewing freedom of the display. The 2D mode is half resolution.

Another type of parallax optic alternative to a parallax barrier well known in the art for use in stereoscopic displays is a lenticular screen, which is an array of vertically extended cylindrical microlenses.

Lens arrays are particularly suitable for autostereoscopic displays because they combine the functionalities of high efficiency, small spot size and ability to manufacture using well known lithographic processing techniques.

FIG. 5 shows a typical structure of a prior art display device using a lenticular screen. A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68,71,73, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 74 and in colour by a colour filter positioned on an LCD colour filter substrate 80. The light then passes through an output polariser 82 after which is placed a lenticular screen substrate 94 and a lenticular screen 96 which is formed on the surface of the lenticular screen substrate 92. As for the parallax barrier, the lenticular screen 94 serves to direct light from alternate pixel columns 69,71,73,75 to the right eye as shown by the ray 88 from the pixel 69 and from the intermediate columns 68,70, 72,74 to the left eye as shown by the ray 90 from pixel 68. The observer sees the light from the underlying pixel illuminating the aperture of the individual lenticule, 98 of the lenticular screen 96. The extent of the captured light cone is shown by the captured rays 100.

In the above arrangement, the LCD pixel plane acts as a spatial light modulator (SLM). As used in this document, the term spatial light modulator or SLM includes both 'light valve' devices such as liquid crystal displays and emissive devices such as electroluminescent displays and LED displays.

Lenticular displays are described in T. Okoshi "Three Dimensional Imaging Techniques", Academic Press, 1976. One type of lenticular display using a spatial light modulator is described in U.S. Pat. No. 4,959,641. The invention of '641 describes non-switching lenticular elements in air.

Such a display may suffer from undesirable visibility of the lens surface due to reflections and scatter at and near to the lenses 96 which will degrade the contrast of the image. Reflections could be for example due to Fresnel reflections.

A lenticular display using cylindrical lenses that are tilted with respect to columns of pixels of a display is described in "Multiview 3D-LCD" published in SPIE Proceedings Vol. 2653, 1996, pages 32 to 39.

As described above, the use of parallax optics to generate a spatially multiplexed 3D display limits the resolution of each image to at best half of the full display resolution. In many applications, the display is intended to be used for a fraction of the time in the 3D mode, and is required to have a full resolution artifact free 2D mode.

One type of display in which the effect of the parallax optic is removed is Proc.SPIE vol. 1915 Stereoscopic Displays and Applications IV (1993) pp177-186, "Developments in Autostereoscopic Technology at Dimension Technologies Inc.", 1993. In this case, a switchable diffuser element is placed in the optical system used to form the light lines. Such a switchable diffuser could be for example of the Polymer Dispersed Liquid Crystal type in which the molecular arrangement switches between a scattering and non-scattering mode on the application of an applied voltage across the material. In the 3D mode, the diffuser is clear and light lines are produced to create the rear parallax barrier effect. In the 2D mode, the diffuser is scattering and the light lines are washed out, creating the effect of a uniform light source. In this way, the output of the display is substantially Lambertian and the windows are washed out. An observer will then see the display as a full resolution 2D display. Such a display suffers from Fresnel diffraction artifacts in the 3D mode, as well as from unwanted residual scatter in the diffuser's clear state which will increase the display cross-talk. Therefore, such a display is likely to exhibit higher levels of visual strain.

In another type of switchable 2D-3D display disclosed in EP-A-0,833,183, a second LCD is placed in front of the display to serve as a parallax optic. In a first mode, the parallax LCD is clear so that no windows are produced and an image is seen in 2D. In a second mode, the device is switched so as to produce slits of a parallax barrier. Output windows are then created and the image appears to be 3D. Such a display has increased cost and complexity due to the use of two LCD elements as well as being of reduced brightness or having increased power consumption. If used in a reflective mode 3D display system, parallax barriers result in very poor brightness due to attenuation of light by the blocking regions of the parallax barrier both on the way in and out of the display.

In another type of switchable 2D-3D display disclosed in EP-A-0,829,744, a parallax barrier comprises a patterned array of half wave retarder elements. The pattern of retarder elements corresponds to the pattern of barrier slits and absorbing regions in a parallax barrier element. In a 3D mode of operation, a polariser is added to the display so as to analyse the slits of the patterned retarder. In this way, an absorbing parallax barrier is produced. In the 2D mode of operation, the polariser is completely removed as there is no involvement of any polarisation characteristics in the 2D mode of operation. Thus the output of the display is full resolution and full brightness. One disadvantage is that such a display uses parallax barrier technology and thus is limited to perhaps 20-30% brightness in the 3D mode of operation. Also, the display will have a viewing freedom and cross talk which is limited by the diffraction from the apertures of the barrier.

It is known to provide electrically switchable birefringent lenses for purposes of switching light directionally. It is known to use such lenses to switch a display between a 2D mode of operation and a 3D mode of operation.

For example, electrically switchable birefringent liquid crystal microlenses are described in European Optical Society Topical Meetings Digest Series: 13, 15-16 May 1997 L. G. Commander et al "Electrode designs for tuneable microlenses" pp48-58.

In another type of switchable 2D-3D display disclosed in U.S. Pat. No. 6,069,650 and WO-98/21620, switchable microlenses comprising a lenticular screen filled with liquid crystal material are used to change the optical power of a lenticular screen. U.S. Pat. No. 6,069,650 and WO-98/21620 teach the use of an electro-optic material in a lenticular screen whose refractive index is switchable by selective application of an electric potential between a first value whereby the light output directing action of the lenticular means is provided and a second value whereby the light output directing action is removed.

A 3D display comprising a liquid crystal Fresnel lens is described in S. Suyama et al "3D Display System with Dual Frequency Liquid Crystal Varifocal Lens", SID 97 DIGEST pp273-276.

In another type of switchable 2D-3D display disclosed in WO-03/015,424 a passive birefringent microlens is switched between a 2D and 3D mode by means of controlling the polarisation of light which passes through the lens and reaches an observer. It is also known from this reference to use twist in passive birefringent lenses in order to rotate the input polarisation such that the birefringent microlens geometric axis is parallel to the birefringent material axis at the lens surface. One of the display devices disclosed in WO-03/015,424 is shown in plan view in FIG. 6 and arranged as follows.

A backlight 102 produces illumination 104 of an LCD input polariser 106. The light passes through a thin film transistor (TFT) substrate 108 and is incident on a pixel layer 110 comprising individually controllable phase modulating pixels 112-126. The pixels are arranged in rows and columns and comprise a pixel aperture 128 and a separating black mask 130. The light then passes through an LCD counter substrate 132 and a lens carrier substrate 136 upon which is formed a birefringent microlens array 138. The birefringent microlens array 138 comprises an isotropic lens microstructure 140 and an aligned birefringent material with an optical axis direction 142. The output of the birefringent lens then passes through a lens substrate 144 and a polarisation modifying device 146.

Each birefringent lens of the lens array is cylindrical; the lens array 138 is a lenticular screen and the geometrical axis of the lenses is out of the page. The pitch of the lenses in this example is arranged to be substantially twice the pitch of the pixels of the display such that a two view autostereoscopic display is produced.

In a first mode of operation, the polarisation modifying device 146 is configured to transmit light with a polarisation state which is parallel to the ordinary axis of the birefringent material of the microlens array. The ordinary refractive index of the material (such as a liquid crystal material) is substantially matched to the index of the isotropic microstructure 140. Thus the lenses have no optical effect and there is substantially no change to the directional distribution of the output of the display. In this mode, an observer will see all the pixels 112-126 of the display with each eye, and a 2D image will be produced.

In a second mode of operation, the polarisation modifying device 146 is configured to transmit light with a polarisation state which is parallel to the extra-ordinary axis of the birefringent microlens array. The extraordinary refractive index of the material (such as a liquid crystal material) is different to the index of the isotropic microstructure 140. Thus the lenses have an optical effect and there is a change to the directional distribution of the output of the display. This directional distribution can be set as well known in the art so as an observer correctly positioned at the front of the display will see a left image in their left eye corresponding to light from left image pixels 112,116,120,124 and in their right eye will see a right image corresponding to right image pixels 114,118,122,126. In this way, a switchable 2D to 3D autostereoscopic display can be produced.

In a 3D autostereoscopic display, a lens array (or lenticular screen) may be used to direct the light into a directional distribution consisting of the appropriate viewing windows. This type of lens array may also be used to direct light into other directional distributions. Examples of such directional distributions are disclosed in WO-03/015,424 and include an enhanced brightness distribution in which light is directed into broad horizontal windows in the nominal viewing plane. In the window, the observer will see an increase of brightness proportional to the vertical aperture ratio of the panel. Out of the viewing window, an observer will see the gaps between the pixels, and the display has reduced brightness.

The first aspect of the present invention relates the structure of a lens array having a birefringent lens capable of directing light into a directional distribution, for example of the type disclosed in WO-03/015,424. As a result of its birefringence, the effect of the lens may be switched by control of the polarisation of light passing through the lens.

According to a first aspect of the present invention, there is provided a lens structure for a directional display apparatus, comprising a birefringent lens capable of directing light of a given polarisation into a directional distribution, the birefringent lens comprising a solid, first birefringent material and an isotropic material having an interface having a refractive structure; and a second birefringent material arranged adjacent the first birefringent material of the birefringent lens, wherein the interface between the first birefringent material and the second birefringent material has an alignment microstructure providing alignment of the first birefringent material and the second birefringent material.

In such a lens structure, the second birefringent layer may provide a number of effects. For example, the second birefringent material may be switchable to control the polarisation of light passing through the lens structure, for example being a switchable liquid crystal layer capable of rotating the polarisation of light passing therethrough. In that case, the second birefringent layer may be used to control the effect of the lens.

Thus the birefringent lens is used as a substrate for the second birefringent material, without the need to provide any intermediate substrate. This provides the advantage of reducing both cost and device thickness. When used in a display apparatus, the separation of the lens from the pixel plane determines the nominal viewing distance for a particular pixel size. The reduction of thickness of the device allows a shorter viewing distance of the display while using standard known substrate thicknesses of the display device. Avoidance of any intermediate substrate can reduce this separation to optimise display performance when the second birefringent material is arranged between the lens and pixel plane as necessary in many types of display apparatus. For example, in the case that the second birefringent material controls the polarisation of light to switch the effect of the lens, positioning it between the lens and pixel plane can optimise display contrast and brightness.

Furthermore, arranging the second birefringent material adjacent the first birefringent material of the birefringent lens allows a single alignment microstructure on the interface therebetween to provide alignment for both the first and second birefringent layers. The alignment microstructure may be used to fix the alignment of the first birefringent material during curing. The cured birefringent material is adjacent the second birefringent material. Therefore the second birefringent material contacts the alignment microstructure which provides alignment of the second birefringent material too. Thus advantageously, the alignment microstructure has a common function. There is no need for additional alignment layer processing steps in order to align the second birefringent material. Thus, the cost and complexity of the lens structure is reduced.

An alignment microstructure is a structure with features which serve to align a liquid crystal layer. Such a structure typically has features of the size of order 50 μm or less. Suitable structures include (but not exclusively): a surface relief of a surface or interface of the first birefringent material; an electro-magnetic structure at the surface or interface of the first birefringent material, for example a structured dipole field; an additional layer, for example providing a structured dipole field; or any combination of such different types of microstructure. A surface relief alignment microstructure may be formed for example by embossing, casting or moulding of a surface. An alignment microstructure in the form of an additional layer may be formed for example by rubbing a layer (such as a polymer layer, for example polyimide) using for example a rubbing cloth; or forming of a photo-alignment layer by exposure of a polymer material to polarised light.

In the case of polyimide layers, the polyimide layer thickness may be sufficiently small such that the dipole field imposed on one surface by means of rubbing, produces an effect on the opposite surface, after the polyimide has been removed from the sacrificial surface. This provides unexpected advantages as described in detail below.

An additional advantage is that the lens structure may be conveniently attached to a display device, and the second birefringent material subsequently filled. The use of the solid lens with alignment structures minimises the cost of the processing required for assembly.

The first birefringent material may be a liquid crystal material, preferably a curable liquid crystal material, more preferable a UV curable liquid crystal material.

To reduce cost of fabrication, said interface between the first birefringent material and the isotropic material of the birefringent lens may also have an alignment microstructure providing alignment of the first birefringent material.

The first birefringent material may have protruding therefrom at least one spacer for spacing the thickness of the second birefringent material. Such a spacer is easily manufactured in the same step in which the alignment microstructure is formed. Therefore this feature avoids the need to include separate spacers which would increase the manufacturing complexity and cost.

In another form according to the first aspect of the present invention, there is provided a birefringent lens for a directional display apparatus, the lens comprising:
a first isotropic material;
a first birefringent material which may be UV curable, a first interface between the first isotropic and first birefringent material comprising a refractive structure, where the refractive structure a lens structure;
a second birefringent material, a second microstructured interface between the first birefringent material and the second birefringent material comprising a diffractive alignment structure arranged to provide alignment of the first birefringent material in a first direction parallel to the grooves of the diffractive alignment structure; and alignment of the second birefringent material in a second direction parallel to the grooves of the diffractive alignment structure.

An additional diffractive alignment structure arranged to provide alignment of the first birefringent material in a first direction parallel to the grooves of the diffraction grating structure may be provided at the first interface.

The second birefringent material may comprise a switchable liquid crystal layer arranged to provide rotation of an input linear polarisation state.

The second aspect of the present invention relates to the structure of a birefringent lens, for example of the type used to change the directional distribution of light in a directional display apparatus as described above. In such a lens there can be diffuse reflection of light from the interface between birefringent material and isotropic material of the lens. Such reflection is disadvantageous. For example, in a display apparatus the reflection of external light from this interface can reduce the contrast of the observed image.

According to the second aspect of the present invention, there is provided a birefringent lens comprising a birefringent material and an isotropic material having an interface having a refractive structure and a surface relief alignment microstructure providing alignment of the birefringent material, wherein the refractive index of the isotropic material is substantially equal to the extraordinary refractive index of the birefringent material.

As a result the alignment structure may be used in common with its alignment effect to reduce the amount of reflection at the interface. This is possible as a result of selecting the isotropic material to have a refractive index substantially equal to the extraordinary refractive index of the birefringent material. This is because the extraordinary axis of the birefringent material is along the direction of alignment. When the light of a polarisation component perpendicular to the alignment direction passes through the lens, there is an index step at the interface, but the degree of diffuse reflection is reduced. This is achieved by an effect similar to 'moth-eye' at the curved surface in which a gradual variation in refractive index is seen due to the sub-wavelength nature of the features of the microstructure.

When the light of a polarisation component parallel to the alignment direction passes through the lens, there is no index step at the interface and so there is no diffuse reflection, except due to any imperfections in the interface. In this way the anti-reflection function is required for only one polarisation state (that which sees the index step), so the diffraction grating can advantageously have a structure which is aligned to this polarisation state only, i.e. is a linear grating. Linear gratings are easier to master and to manufacture accurately due to their simpler structure. Therefore a linear grating has a higher performance.

In contrast, if the refractive index of the isotropic material was equal to the ordinary refractive index of the birefringent material, then the light experiencing the index step at the interface would be the light of a polarisation component parallel to the alignment direction. Thus there would be diffuse reflection because the alignment microstructure would have little effect on the light of this polarisation and so the interface would appear as a planar surface at the scale of the wavelength of the light.

By such means of the microstructure providing in common alignment properties and anti-reflection properties, the performance of the device can be enhanced for minimal additional cost, without the requirement for further layers in the system.

An alignment microstructure is a structure with features which serve to align a liquid crystal layer. Such a structure typically has features of the size of order 50 µm or less. In general, suitable structures include a surface relief of a surface or interface; an electro-magnetic structure such as a structured dipole field; or an additional layer, for example providing a structured dipole field, but in accordance with the second aspect of the invention, the alignment microstructure will include a surface relief in order to provide an anti-reflection function. Such surface relief may be formed for example by embossing, casting or moulding of a surface.

Preferably, the surface of the birefringent material on the opposite side from the isotropic material has an alignment microstructure providing alignment of the birefringent material in the same direction with respect to a given polarisation component as the alignment provided by the alignment microstructure with respect to the given polarisation component at the interface between the birefringent material and the isotropic material. Advantageously, this further reduces reflections in the system at a minimal extra cost.

The surface of the birefringent material on the opposite side from the isotropic material may be a plane interface or a second birefringent lens interface so as to provide a biconvex lens. Biconvex lens advantageously may allow a shorter back working distance for the lens, thus allowing a thinner cell, reducing material consumption and reducing cost. Biconvex lenses additionally allow a reduction of chromatic aberrations of the lens, advantageously increasing window quality.

Advantageously, the surface relief alignment microstructure(s) may have features with a dimension of the order of the wavelength of visible light or less. Such a size for the features maximizes the anti-reflection properties, because they provide an effective gradient in the change of refractive index, rather than a step change, along the propagation direction at the interface.

For use in a directional display apparatus, the birefringent lens may be a lens array in which the refractive structure of said interface between the birefringent material and the isotropic material may be shaped to direct light of a polarisation component parallel to the ordinary axis of the birefringent material into a directional distribution.

The third aspect of the present invention relates the structure of a lens array having a birefringent lens capable of directing light into a directional distribution, for example of the type disclosed in WO-03/015,424. As a result of its birefringence, the effect of the lens may be switched by control of the polarisation of light passing through the lens.

According to a third aspect of the present invention, there is provided a lens structure for a directional display apparatus, comprising:

a birefringent lens array capable of directing light of a given polarisation into a directional distribution;

a switchable liquid crystal layer capable of rotating the polarisation of light passing therethrough;

a pair of electrodes for applying an electric field to switch the liquid crystal layer, the electrodes being arranged with both the birefringent lens array and the switchable liquid crystal layer therebetween, the material of the birefringent lens array having an electrically conductive material incorporated therein.

Thus the birefringent lens is used as a substrate for the liquid crystal layer, without the need to provide any intermediate substrate. This provides the advantage of reducing both cost and device thickness. When used in a display apparatus, the separation of the lens from the pixel plane determines the nominal viewing distance for a particular pixel size. The reduced thickness of the device allows a shorter viewing distance of the display while using standard known substrate thicknesses of the display device. Avoidance of any intermediate substrate can reduce this separation to optimise display performance when the liquid crystal layer is positioned between the lens and pixel plane to optimise display contrast and brightness.

It is advantageous that electrodes are positioned external to the birefringent lens and liquid crystal layer because the processing requirements for transparent electrodes mean that they can be deposited on glass substrates prior to processing of the other layers in the structure. Advantageously, the thickness of the lens is nominally constant across the surface, so that a nominally constant field may be dropped across the switchable liquid crystal layer. Such a configuration means that electrodes do not need to be applied directly to interface between the lens and the liquid crystal layer which may produce a poor performance electrode layer due to the limited processing temperature allowed.

If the field is dropped across the lens in addition to the switch, then an increased voltage will need to be applied to the switch which is undesirable. Applying a transparent electrode to the interface between the birefringent lens and the liquid crystal layer may be disadvantageous as the performance of the layer may be limited due to limitations of processing temperature. Advantageously, this embodiment overcomes these restrictions by incorporating a conductive material in the polymer matrix of the lens.

A conductive electrode may be added to the substrate on which the conductive lens material is mounted to improve the electrical switching performance of the switchable lens. The conductive electrode may be transparent, for example indium tin oxide. The conductive electrode may also take the form of conductive (low ohm) bus bars, which may be formed as a slab of highly conductive material outside the visible area.

Embodiments of the present invention will now be described, by way of example only, with reference to the accompanying drawings, in which:

FIG. 13b shows the formation of a birefringent lens on the structure of FIG. 13a;

FIG. 13d shows the use of a shim with a diffractive alignment microstructure in addition to the structure of FIG. 13a;

FIG. 15b shows the biconvex lens formed by the process in FIG. 15a;

Figure 1A:
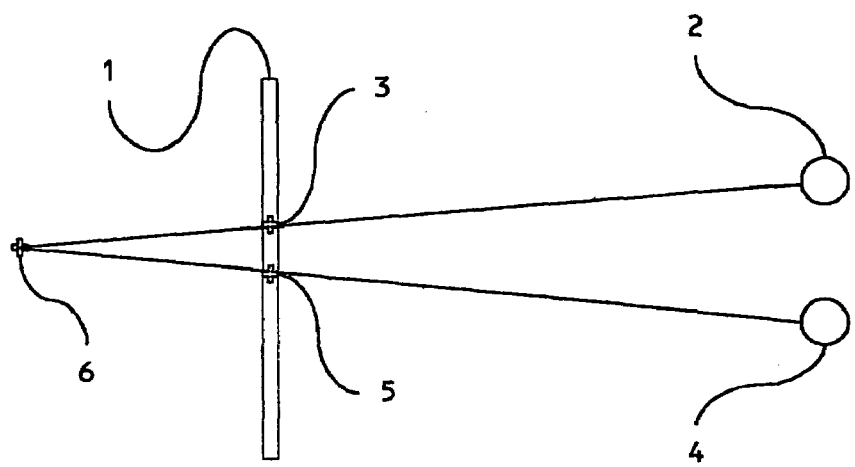
FIG. 1a shows the generation of apparent depth in a 3D display for an object behind the screen plane.
Figure 1B:
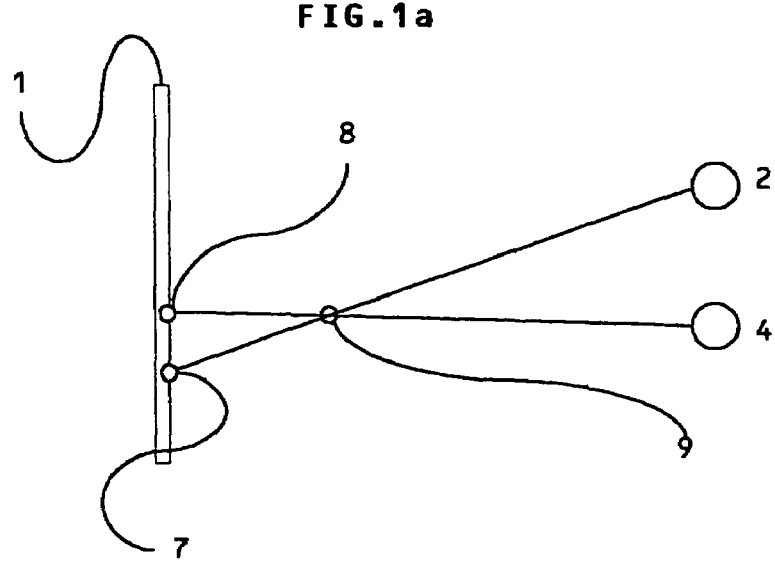
FIG. 1b shows the generation of apparent depth in a 3D display for an object in front of the screen plane.
Figure 1C:
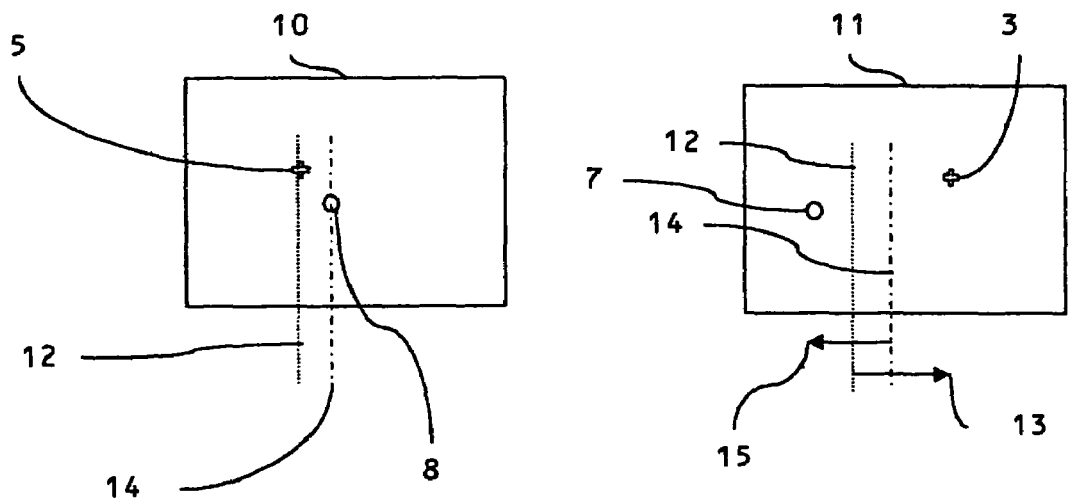
FIG. 1c shows the position of the corresponding homologous points on each image of a stereo pair of images.
Figure 2A:
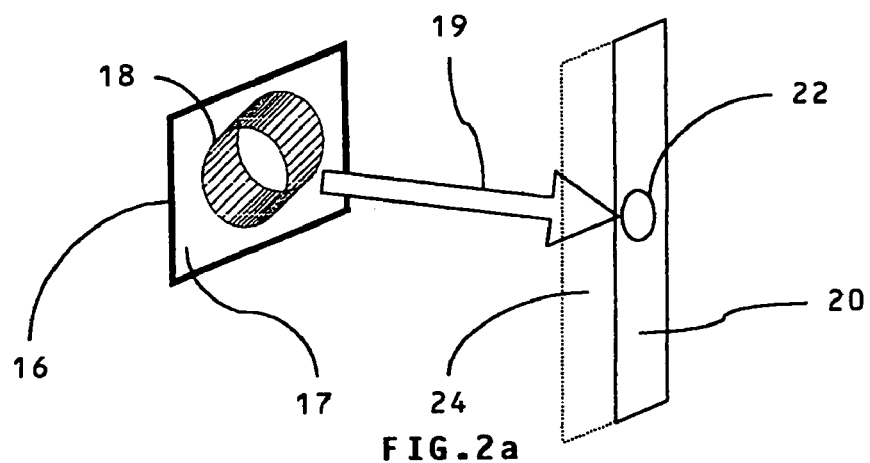
FIG. 2a shows schematically the formation of the right eye viewing window in front of an autostereoscopic 3D display.
Figure 2B:
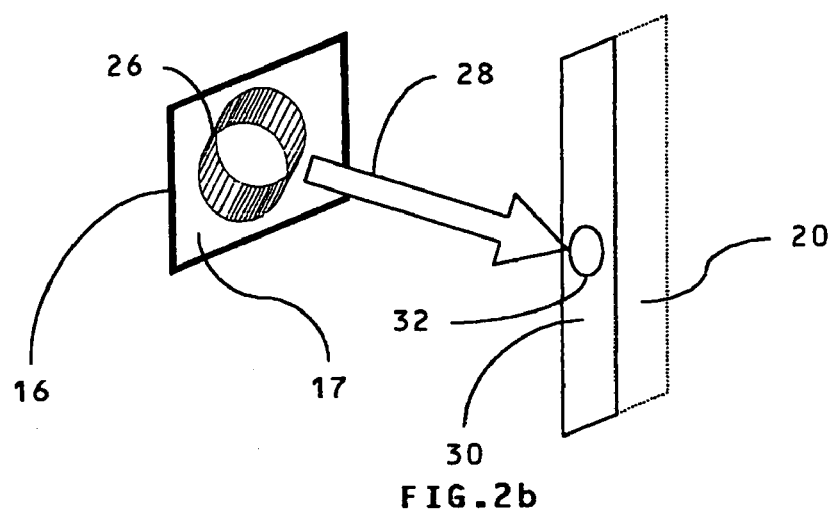
FIG. 2b shows schematically the formation of the left eye viewing window in front of an autostereoscopic 3D display.
Figure 3:
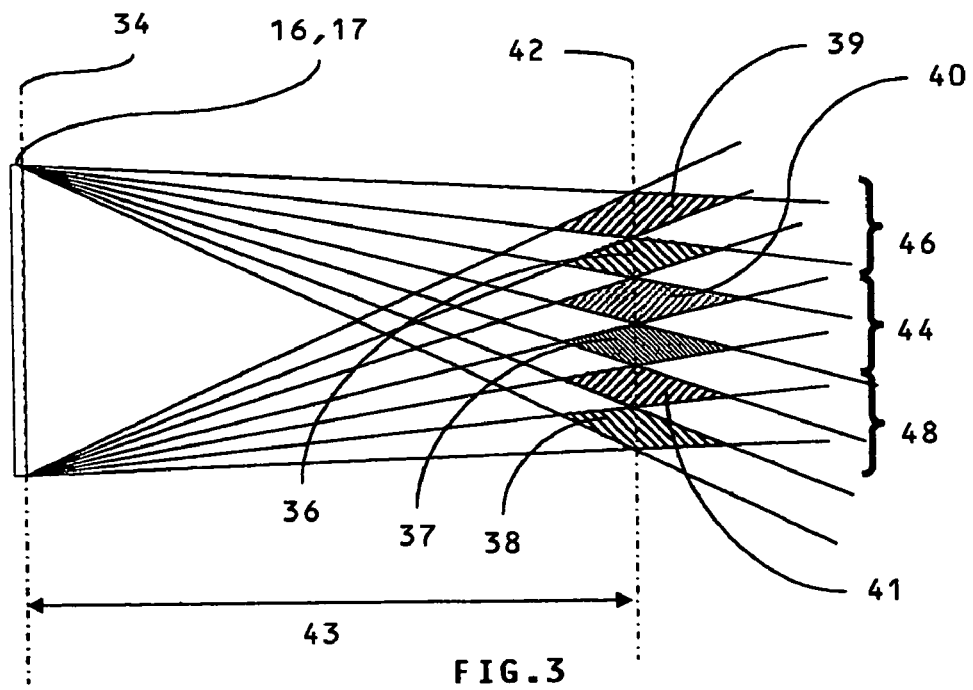
FIG. 3 shows in plan view the generation of viewing zones from the output cones of a 3D display.
Figure 4A:
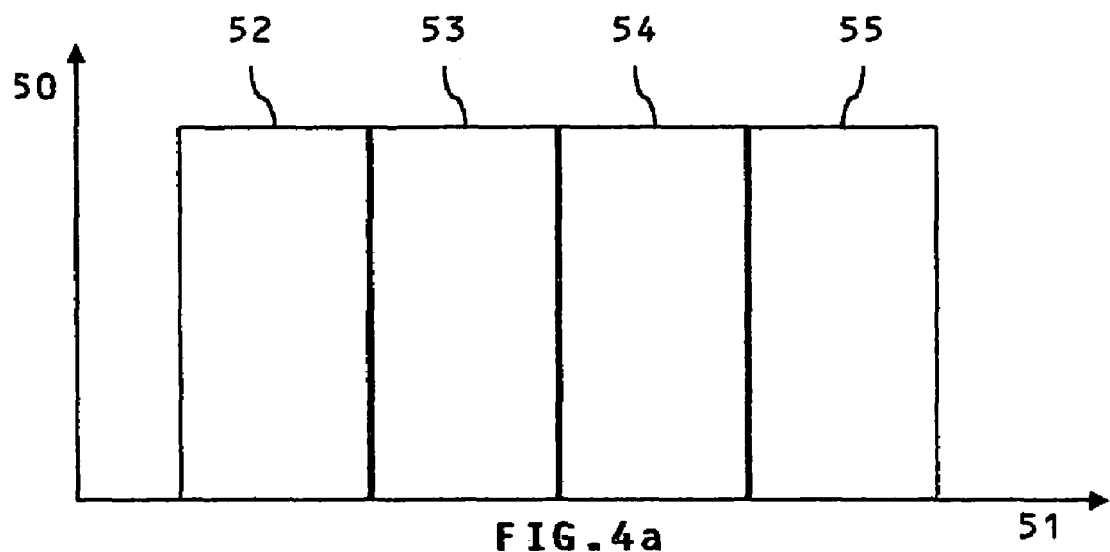
FIG. 4a shows the ideal window profile for an autostereoscopic display.
Figure 4B:
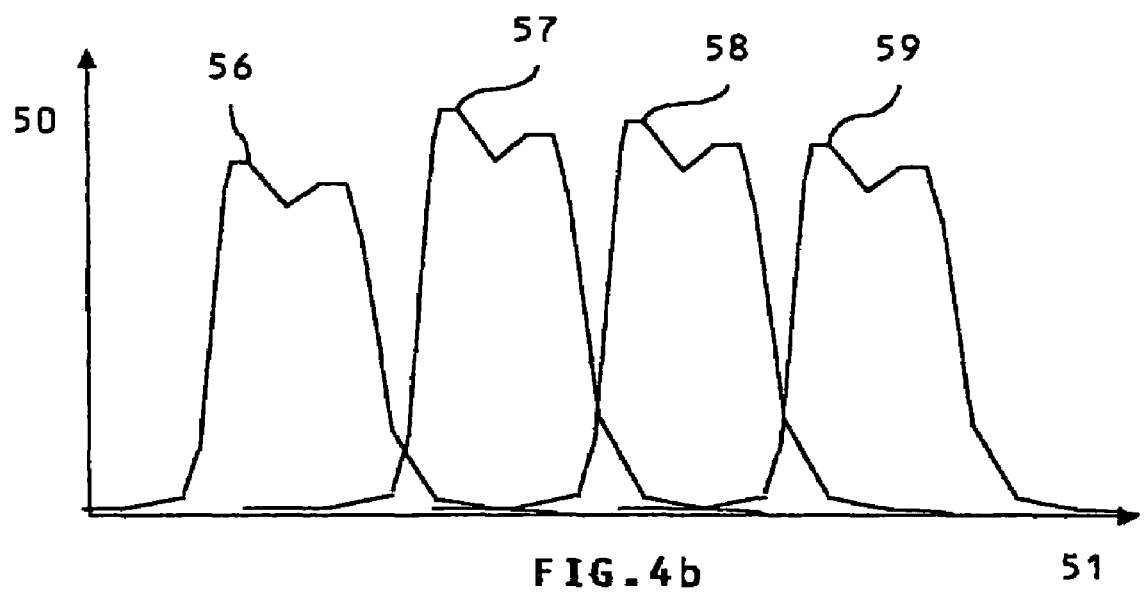
FIG. 4b shows a schematic of the output profile of viewing windows from an autostereoscopic 3D display.
Figure 5:
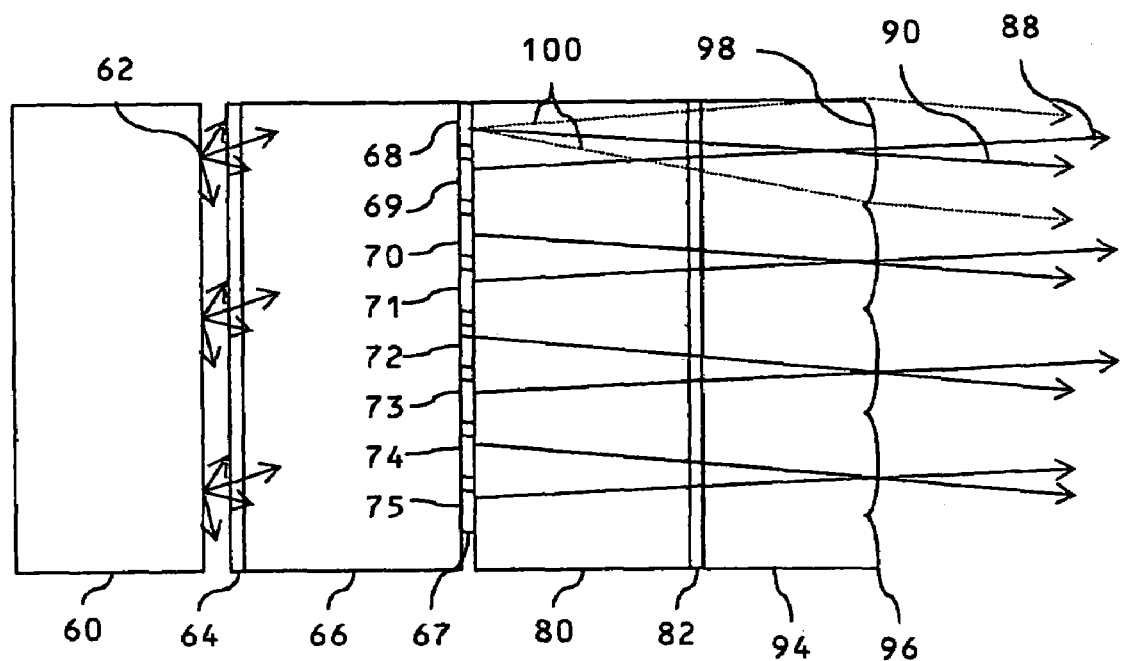
FIG. 5 shows the structure of a lenticular screen display.

Some of the various embodiments employ common elements which, for brevity, will be given common reference numerals and a description thereof will not be repeated. Furthermore the description of the elements of each embodiment applies equally to the identical elements of the other embodiments and the elements having corresponding effects, mutatis mutandis. Also, the figures illustrating the embodiments which are displays show only a portion of display, for clarity. In fact, the construction may be repeated over the entire area of the display.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

A cylindrical lens describes a lens in which an edge (which has a radius of curvature and may have other aspheric components) is swept in a first linear direction. The geometric microlens axis is defined as the line along the centre of the lens in the first linear direction, i.e. parallel to the direction of sweep of the edge. The term "cylindrical" as used herein has its normal meaning in the art and includes not only strictly spherical lens shapes but also aspherical lens shapes.

In a 2D-3D type display, the geometric microlens axis is vertical, so that it is parallel or at a slight angle to the columns of pixels of the display. In a brightness enhanced display as described herein, the geometric microlens axis is horizontal so that it is parallel to the rows of the pixels of the display.

For a two view display, the pitch of the lenses in a lens array is substantially equal to twice the pitch of the pixels of a spatial light modulator with which the lens array is to be used. In fact the pitch of the lenses in a lens array is slightly less than twice the pitch of the pixels of the spatial light modulator to steer the light to the viewing window in way commonly known as "viewpoint correction". The curvature of the lenses is set substantially so as to produce an image of the LCD pixels at the window plane. As the lenses collect the light in a cone from the pixel and distribute it to the windows, lens arrays provide the full brightness of the incident light.

Herein, the term diffractive alignment microstructure refers to a surface relief microstructure, that is a microstructure in the form of a surface relief of a surface or interface for providing alignment of a birefringent material. Due to the typically used pitch regime for these structures, the pitch size is similar to that employed in diffraction gratings, and the alignment microstructures may be formed by techniques known for diffractive structures such as interference effects or ruling. However diffractive properties are not the principle function of the microstructures in these embodiments.

Figure 6:
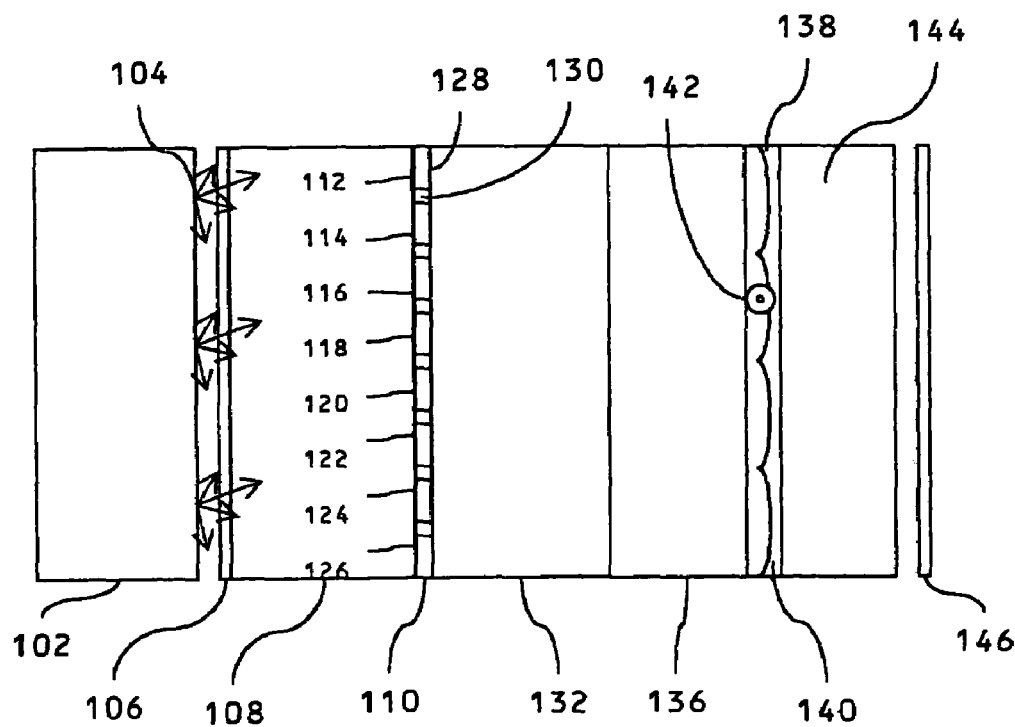
FIG. 6 shows a prior art polarisation activated microlens display.
Figure 7:
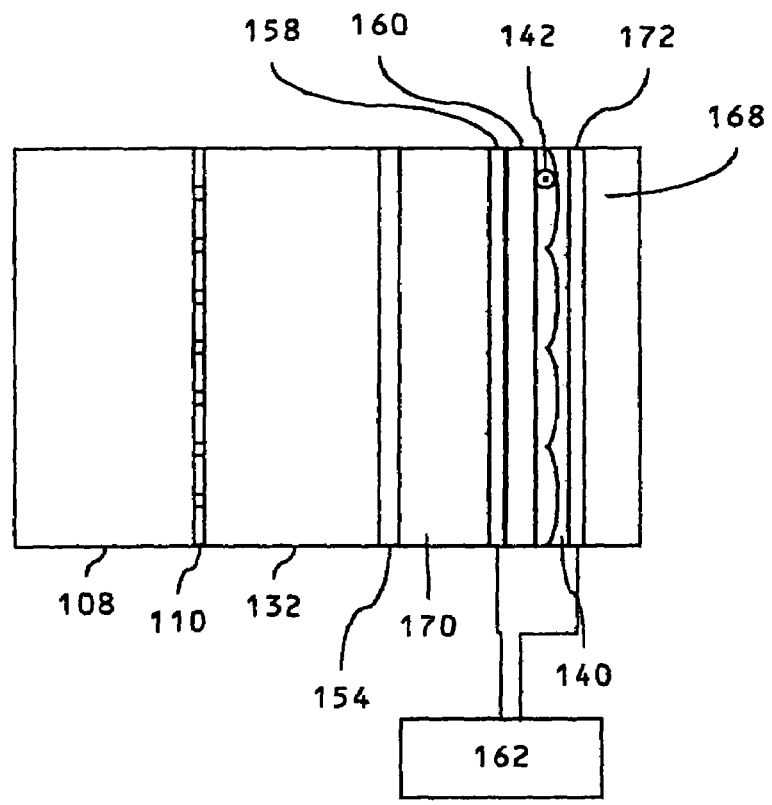
FIG. 7 shows a polarisation activated microlens display.

FIG. 7 shows a directional display apparatus which is a modification of the directional display apparatus shown in FIG. 6 and described in WO-03/015,424. The backlight and input polarisers are not shown. The polariser 146 of FIG. 7 is replaced by a switchable liquid crystal layer 160 placed in contact with the liquid crystal lens 142, which may be a solid liquid crystal lens, and an output polariser 154. The liquid crystal layer 160 is capable of rotating the polarisation of light passing therethrough. For switching of the liquid crystal layer 160, ITO electrode layers 158 and 172 are provided sandwiching both the liquid crystal layer 160 and the lens 142. The substrates 136 and 144 of FIG. 6 are replaced by substrates 170 and 168, respectively An electrical signal controller 162 allows switching of the electric field across the ITO electrode layers 158 and 172 to cause the liquid crystal layer 160 to switch. This allows control of the polarisation state transmitted through the output polariser 166, and thus the function of the lens, in the same manner as described in WO-03/015,424, which is incorporated herein by reference. The lens 142 is arranged to direct light of a first polarisation component into a directional distribution but substantially no effect on light of a second polarisation component perpendicular to the first polarisation component. In one mode of operation, the liquid crystal layer 160 is switched to cause the first polarisation component to pass through the lens 142 and in another mode of operation, the liquid crystal layer 160 is switched to cause the second polarisation component to pass through the lens 142. Thus the switching of the liquid crystal layer 160 controls whether or not the lens 142 has effect and allows switching of the directional distribution of the output of the display apparatus.

An output polariser 154 is placed on the counter substrate 132. The output polariser 154 in combination with the provision of the liquid crystal layer 160 between the lens 142 and the spatial light modulator allows switching of the lens 142 with full image contrast and brightness in both directional modes.

Figure 8:
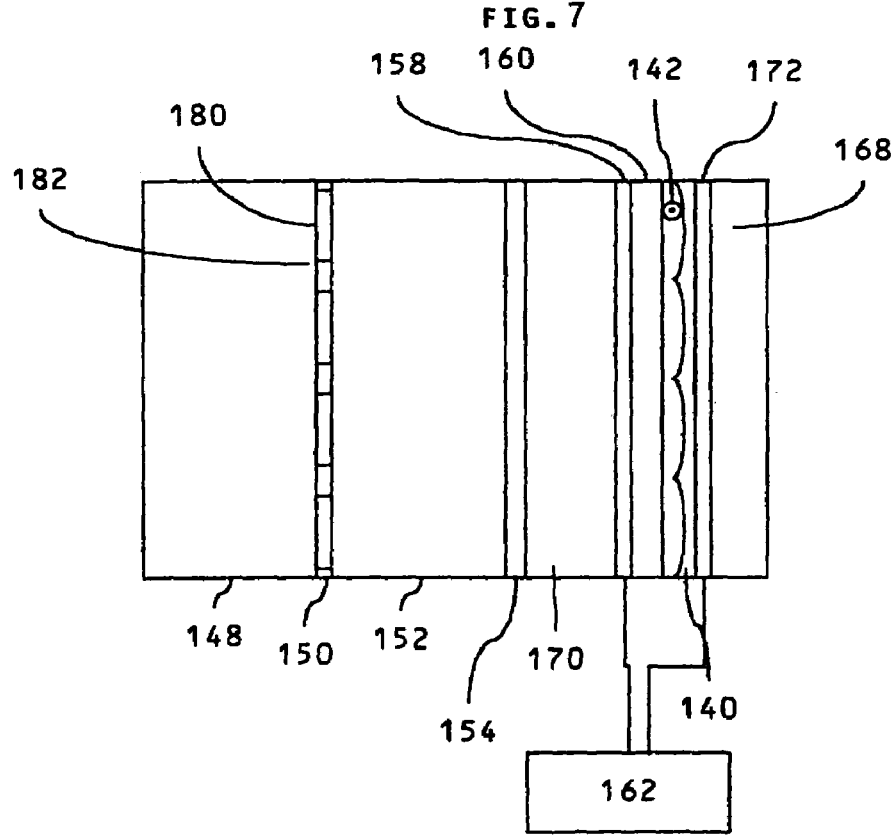
FIG. 8 shows a polarisation activated microlens display.

FIG. 8 shows an alternative configuration of the display of FIG. 7, in which the two view pixel columns of an autostereoscopic display are replaced by the apertures of an enhanced brightness display. In this case, a pixel aperture 180 is separated by a gap region 182. The lens array serves to image the pixel 180 to a window plane. An observer in the window will see an enhanced brightness of the image on the display, and a reduced brightness in regions outside the window.

An integrated lens cell and polarisation switch device as shown in FIGS. 7 and 8 is described in co-pending British Patent Application no. GB0302659.8 and International Patent Application No. PCT/GB04/000366, which are incorporated herein by reference. Further details which may be applied to the present embodiments are disclosed therein.

The specific structure of the lens 142 and liquid crystal layer 160 will now be described with reference to FIG. 9. In the following description, lens 142 is formed by the combination of a layer of isotropic material 202 and a layer of birefringent lens material 214, and the substrate 168, electrode layer 172, liquid crystal layer 160, electrode layer 158 and substrate 170 correspond to, respectively, a substrate 200, electrode layer 238, liquid crystal layer 242, electrode layer 246 and substrate 244.

The substrate 200 may have an ITO layer 238 on the surface upon which the isotropic lens 202 is positioned. In the example, a diffractive alignment microstructure 212 is formed in the lens surface, and a cured LC layer added with a second diffractive alignment microstructure 240.

Advantageously, this replicated alignment microstructure 240 serves two functions. In a first function, it creates the appropriate alignment of the cured LC material during alignment and curing of the lens material 214. Additionally, the microstructure 240 will serve to align a second layer of liquid crystal material 242 sandwiched between it and a lens counter substrate 244 with ITO layer 246 and alignment layer 248. Thus, subsequent processing of the lens 214 is advantageously avoided, reducing the cost of the system as well as removing the need for additional substrate layers and further alignment layers.

The electric field across the LC layer is applied across the ITO layers 246,238 and determines the alignment of the liquid crystal in the rotation cell 242. As an alternative to reduce the field required, the ITO electrode 238 could be positioned on the microstructure 240. However, it is advantageous that electrode layers 238, 246 of FIG. 9 are positioned external to the birefringent lens 214 and switchable liquid crystal layer 242 because of the processing requirements for the transparent electrodes mean that they can be deposited on the glass substrates 244, 200 prior to processing of the other layers in the structure. This means that they may have use higher performance electrodes. Advantageously, the thickness of the lens 214 and isotropic layer 202 is nominally constant across the surface, so that a constant field may be dropped across the switching layer 242. Such a configuration means that electrodes do not need to be applied directly to the microstructure 240 which may produce a poor performance electrode layer due to the limited processing temperature allowed. Also, applying a transparent electrode to the lens surface 214 may be disadvantageous as the performance of the layer may be limited due to limitations of processing temperature.

If the field is dropped across the lens 142 and the switch, then an increased voltage will need to be applied to the switch which is undesirable as it may require electronics in the switching circuit in addition to those already used to address the display panel. To reduce this problem, the lens material 214 can incorporate additional conductive material so that the lens forms an electrode element for addressing the liquid crystal layer 242. The material may be a conductive polymer incorporated in to the polymer matrix of the lens structure. As the lens is closer to the polarisation rotation cell 242, then advantageously a lower voltage driver is required for the cell.

Figure 9:
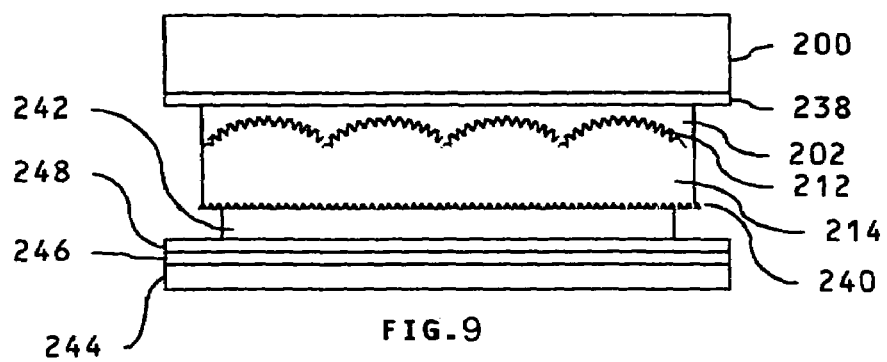
FIG. 9 shows a birefringent lens and polarisation rotator of the invention with a common diffractive alignment microstructure for the lens and liquid crystal cell.
Figure 10:
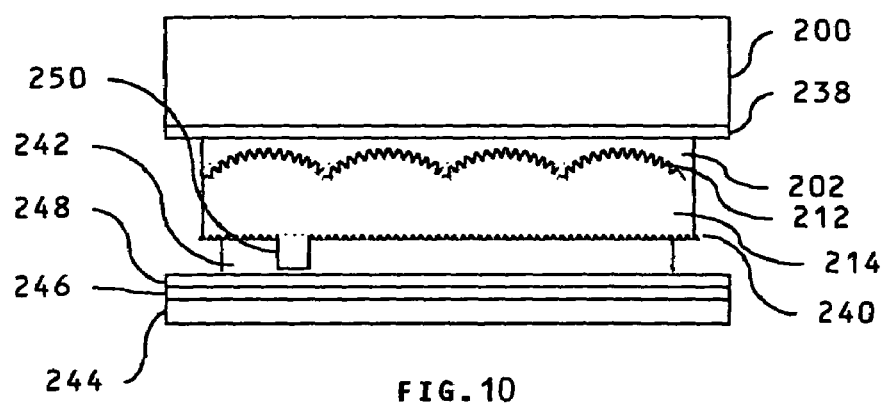
FIG. 10 shows the apparatus of FIG. 9 with a spacer element integrated in the liquid crystal material.

FIG. 10 shows a further embodiment of the invention as shown in FIG. 9 in which spacer pillars 250 are incorporated in the replicated microstructure 240, so as to provide spacing of the cell 242, thus reducing cost by not requiring the use of additional spacer ball processing step in the gap defining the polarisation rotation cell. The spacer pillars may be formed by selective removal of material from the inverse polarity master replication tool for example. Such an integrated spacer pillar 250 can be formed in the plane surface of the birefringent lens to form a spacer for the polarisation rotation cell. This avoids the need for additional spacers in the structure of the device and is thus cheaper to manufacture.

Figure 11:
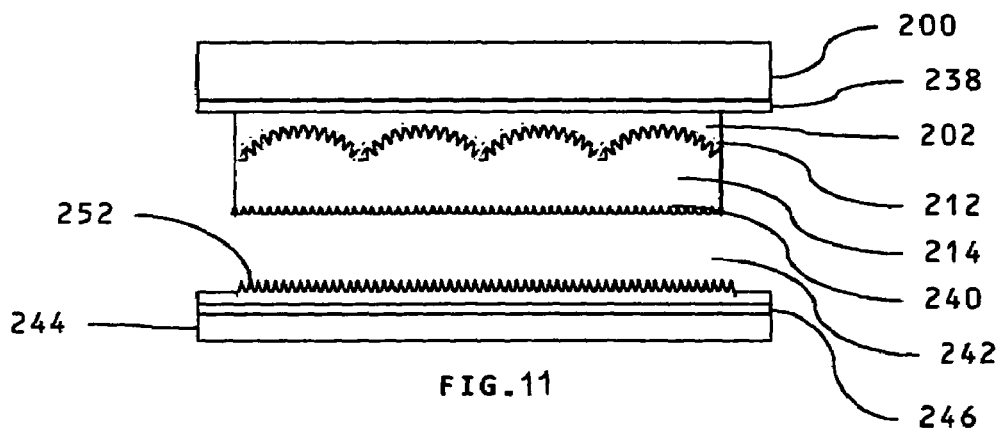
FIG. 11 shows the use of a further diffractive alignment microstructure in the apparatus of FIG. 9.

FIG. 11 shows the use of a second replicated alignment microstructure 252 on the plane substrate in an isotropic material for the counter substrate 244 of the polarisation rotation cell.

Figure 12:
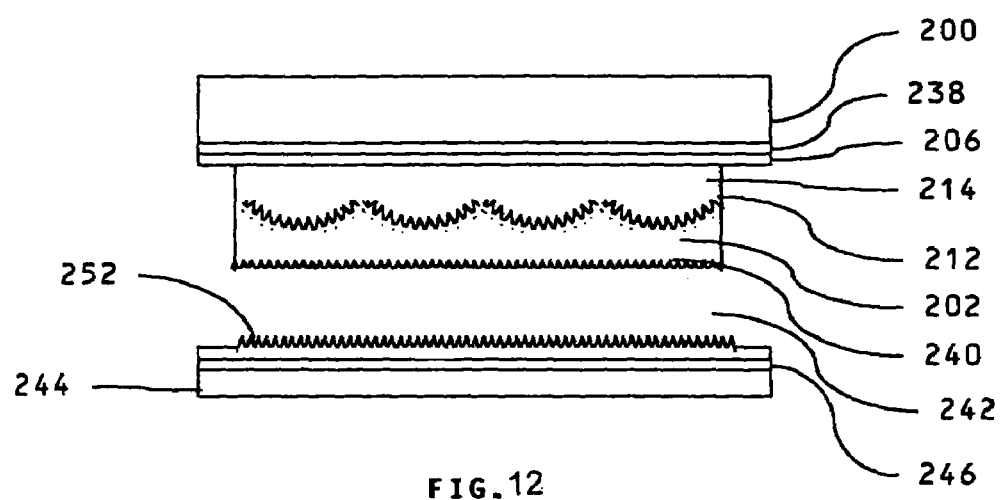
FIG. 12 shows the apparatus of FIG. 9 with an inverted lens structure.

FIG. 12 shows that the lens material and curvature may also be inverted to obtain a similar focusing effect. In this case, an alignment layer 206 is inserted on top of the ITO layer 238 on the substrate 200.

In each of the embodiments described, the microstructure 212 may be replaced with a conventional alignment layer deposited on the isotropic material 202.

The diffractive alignment microstructure 240 is used to fix the alignment of the liquid crystal material in the lens 214 during curing in the case that the lens material 214 is a curable liquid crystal material. The cured substantially plane surface of the lens thus comprises a surface relief diffractive alignment microstructure 240. This is in contact with a second liquid crystal layer 242. The diffractive alignment microstructure 240 serves to provide alignment of the material 242.

Thus advantageously, the substantially planar microstructure 240 has a common function of aligning the liquid crystal material of the lens 214 during cure, and aligning the liquid crystal material 242 of the switch during operation. There is no need for additional alignment layer processing steps. The cost and complexity of the device is thus reduced. The separation of the lens surface 212 from the pixel plane (not shown) of the device is also reduced as there is no requirement for intermediate substrates between the lens and switch layers. The reduction of thickness of the device is particularly advantageous as it allows a shorter viewing distance of the display while using standard known substrate thicknesses of the display device. The first interface of the lens may be the refractive interface with an isotropic material. To reduce cost of fabrication, this interface may also comprise a diffractive alignment structure.

An additional advantage is that the lens cell structure may be conveniently attached to a display device, and the polarisation switch cell material subsequently filled. The use of the solid liquid crystal lens with diffractive alignment structures minimises the cost of the processing required for the assembly of the switch cell.

The structure of FIG. 9 may be formed for example as shown in FIG. 13. As shown in FIG. 13a, a lens substrate 200 has an isotropic material 202 formed on its surface. A microstructure 212 is formed which comprises both refractive and diffractive features. The refractive features serve to define the refractive performance of the lens, while the diffractive feature has at least the function of providing alignment for a birefringent material 214 applied to the surface as shown in FIG. 13b. The material 214 may be a conventional liquid crystal material or may be a UV curable liquid crystal material for example. The alignment of the birefringent material at the second interface 215 may be for example homeotropic if no alignment layer is applied to this surface. The lens of FIG. 13b may have an alignment layer (not shown) attached to this surface, so that it forms one substrate of a polarisation rotator optical switch. However, such an element requires the processing of such additional layers which will increase the cost of the element.

Figure 13A:
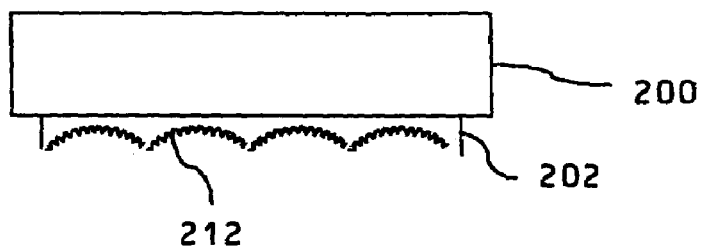
FIG. 13a shows the formation of an isotropic surface relief structure with a diffractive alignment microstructure.
Figure 13B:
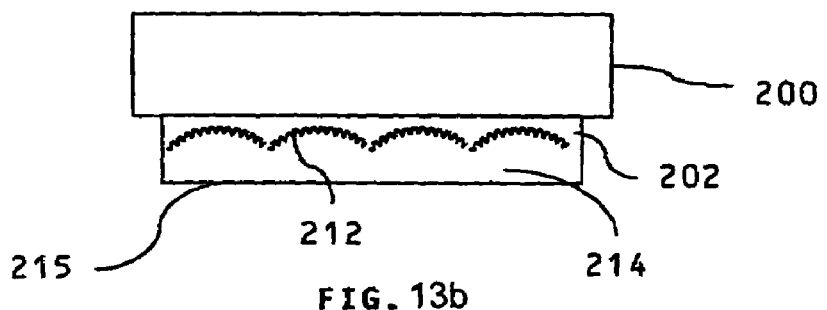
Figure 13C:
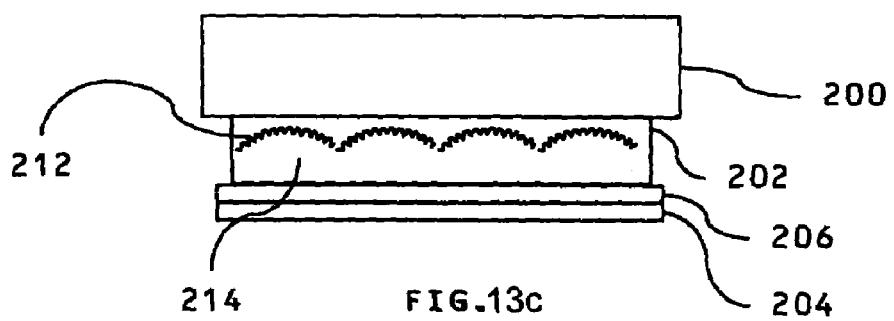
FIG. 13c shows the attachment of an additional substrate to the substrate of FIG. 13a and the filling with a birefringent material.

A lens structure as shown in FIG. 13c can be formed for example in which a thin substrate 204 has an alignment material formed on its surface, and is used to align the counter substrate of the lens device.

Figure 13D:
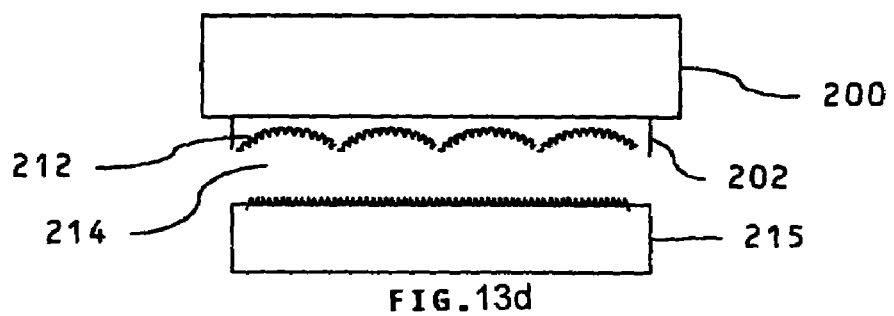
Figure 13E:
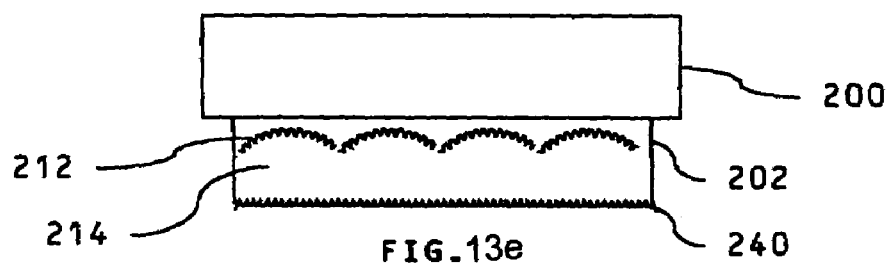
FIG. 13e shows the lens structure produced after the step of FIG. 13d.

In an integrated polarisation rotator of the present invention, a replication shim 215 is used to form the second surface of the lens as shown in FIG. 13d. The birefringent material 214 is UV curable and introduced between the shim and the surface 212. The shim 215 has an appropriately aligned diffractive alignment microstructure formed on its surface which serves to align the birefringent material 214. The diffractive alignment microstructure on the shim 215 may be arranged to provide rotation of the birefringent material in the lens. After UV curing, the shim 215 is released so that the cell as shown in FIG. 13e is produced. The microstructure on the shim 215 leaves the microstructure 240 on the birefringent material 214. As described previously, spacers may also be incorporated in to the shim 215 to provide pillars of birefringent material to space the rotation cell gap.

Figure 13F:
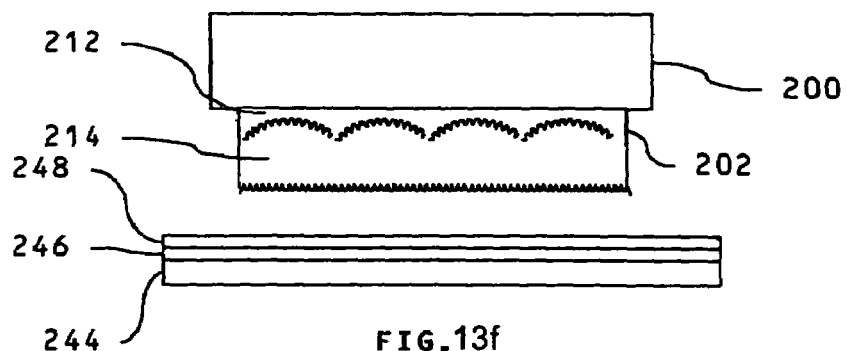
FIG. 13f shows the formation of the structure of FIG. 9 from the structure of FIG. 13e.

A second substrate 244 is now introduced as shown in FIG. 13f. The substrate 244 may comprise the counter substrate of a display device, or may be a polariser or waveplate for example. The substrate incorporates ITO electrodes 246 and alignment layers 248 for example. The alignment layer 248 may also incorporate a diffractive alignment layer. The gap between the birefringent lens and alignment layer 248 is filled with a switchable liquid crystal for example. The liquid crystal will take up the alignment as provided by the diffractive alignment structure 240 incorporated in the lens cell.

Figure 14A:
FIG. 14a shows the formation of an isotropic lens structure.

The passive birefringent lens of FIG. 7 for example and described in WO-03/015,424 can be made in the following manner, as shown in FIG. 14. In FIG. 14a, a first substrate 200 has an isotropic lens structure 202 formed on its surface. The substrate 200 may be a glass substrate of substantially the same thermal expansion coefficient as the counter substrate 132 of the display device. In this way, the change in pitch between the lens and pixel patterns will be minimised during thermal variations of the display. The isotropic material 202 may be for example, but not limited to a UV cured polymer material for example, formed by UV casting. Such a material may be for example NOA71 available from Norland Optical Products. The stress on the attachment of the lens to the respective substrate is also minimised. This allows a flatter element to be produced, which advantageously produces higher quality viewing windows.

Figure 14B:
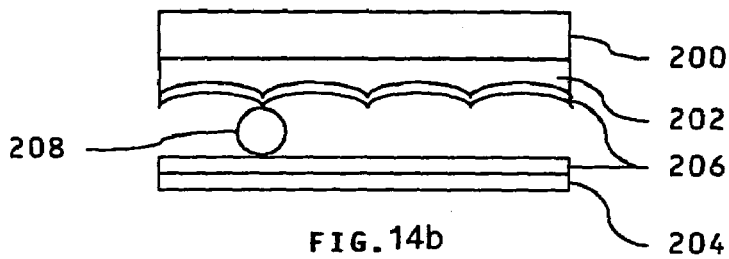
FIG. 14b shows the use of spacer balls to space the substrates of a birefringent lens.

In FIG. 14b, an alignment layer 206 is applied to the surface of the isotropic lens structure 202 and a second substrate 204. The alignment layer may be for example a rubbed polyimide layer. The alignment layer material may be a low temperature alignment layer material such as RN-1340 available from Nissan Chemicals. Such materials may be cured at temperatures within the processing regime of the UV cured polymer materials.

Figure 14C:
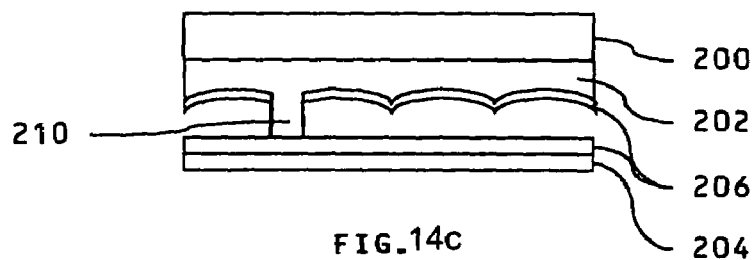
FIG. 14c shows the use of an integrated spacer element to space the substrates of a birefringent lens.

An optional spacer 208 may be integrated in to the lens cell in order to provide a spacing between the cusps of the lenses and the lens counter substrate 204. The spacer 208 may comprise spacer balls, spacing fibre, or may be an integrated spacer 210 integrated into the structure of the replicated lens, as shown in FIG. 14c for example. In the case of the integrated spacer element, this may be formed in the master of the replication tool used to replicate the lenses, by selective removal of material from an inverse polarity master tool prior to forming the correct polarity shim. The height of the spacer may be set so as to ensure that there is guiding through the birefringent material in the region of the cusps of the lenses. For example, the spacer height may be between 2-10 μm. Such guiding enables the output polarisation of the display device to match to the alignment direction at the lens surface, preferably parallel to the geometric microlens axis. The spacers may preferably be pillars to minimise visibility.

Alternatively, the spacers may be formed on the lens counter substrate 204, 206, and the lens brought in to contact with the spacer.

The birefringent lens of WO-03/015,424 may require rotation of polarisation state in the area of the cusps of the lens. If the gap to the plane surface is not sufficiently large, for example 5 μm, then the polarisation state will be insufficiently well guided and the region in the area of the cusps will not function in an ideal manner. This can cause an increase of display cross talk or reduction of brightness or contrast of the display. A spacer arranged as described above reduces these degradation effects and removes the need for additional spacers in the structure of the device and is thus cheaper to manufacture.

Ways of optimising the liquid crystal lens structure will now be described.

In a further aspect of the present invention, the cure temperature of the UV cured LC is set to optimise the spot shape and chromatic aberrations at the pixel plane.

The gap between the alignment microstructures 206 or 212, 240 may be filled with birefringent material, such as a liquid crystal material. The birefringent material may be a UV curable liquid crystal such as RM257 from Merck, cured at an elevated temperature. The cure temperature may be set so that the ordinary index of the birefringent material is substantially matched to the index of the isotropic material 202. Alternatively, the cure temperature may be set so that the extraordinary index of the birefringent material is such that in combination with the radius of curvature, the desired back working distance of the lens to the pixel plane is achieved. In the latter case, the ordinary refractive index of the birefringent material is required to maintain substantially the same as the isotropic material, although small differences may be tolerable as the visibility of fringes generated in the 2D mode may be sufficiently small.

The spot formed at the pixel plane will have chromatic aberrations due to the dispersions of the birefringent material and isotropic material. The transverse chromatic aberrations at the pixel plane will ideally be minimised so that the switching performance at the window boundary is achromatic. However, there may remain some residual transverse chromatic aberration causing the window boundary to be coloured. This colouration may be used to help users find the optimum window position. The colour of the boundary may be selected by choice of radius, separation and materials in the lenses.

In another aspect of the invention, one or more of the diffractive alignment microstructures 240 or 212, preferably the diffractive alignment microstructure 240 by itself, is arranged to compensate for the chromatic aberration produced by the refractive structure of the microstructure 240 between the isotropic material 202 and the lens material 214.

Such chromatic aberration of the lens will occur due to differences in the dispersions of the isotropic and birefringent materials. Chromatic aberrations will serve to produce a different spot size for each wavelength from the lens. To maximise window quality of the display, the spot size should be as uniform as possible across the spectrum, so the window boundary is not coloured. If a diffractive structure is chosen to align the liquid crystal material at the lens boundary, then some correction for chromatic aberration can be introduced by setting the pitch of the grating so as to produce a variation of the focal length for different incident colours. Thus, such an arrangement increases the quality of the viewing window of the display, while not increasing the cost of the system and not requiring additional layers.

In a further aspect of the present invention, the lens cell is sealed by means of the cure of the liquid crystal material which advantageously optimises cell flatness and window quality.

The flatness of the lens determines the quality of the window profile across the display surface. The substrate 204 may be for example a glass Microsheet of thickness 50-150 μm to minimise the separation of the lens from the pixel plane. Alternatively, a plastic or composite material may be used. During the assembly of the lens cell, there may be distortions of the lens device so that the flatness is degraded. This effect can be reduced by reducing the thickness of the base layer of material 202, so that the strain caused by the shrinkage in the isotropic polymer is minimised. Similarly, low shrinkage glues may be applied to seal the cell with minimum distortion of flatness. If a UV curable polymer is used, the cell may not require additional sealing, reducing the opportunity for distortion of the lens, and thus increasing window uniformity.

It may be desirable to reduce the separation of the lens surface from the pixel plane by removing the Microsheet layer. With UV curable liquid crystal polymers, the substrate 204 or alternatively the substrate 200 can be for example a plane shim made from a material such as Nickel or copper with an optional release layer, so that it can be released following cure. Such an approach can be used in the configuration as shown in FIG. 9, or alternatively, the structure as shown in FIG. 13e for example can be attached directly to the panel in configurations such as those shown in FIG. 6 in which case layer 136 can be omitted for example.

In a further aspect of the present invention, diffractive alignment layers are incorporated in to replication tools to advantageously reduce the cost of the lens fabrication process.

To avoid the need for coating, the alignment microstructures may be formed by diffractive alignment microstructures. This is particularly valuable for cured polymer layers, where the diffractive alignment may be formed in a single replicating-shim; As shown in FIG. 13a, a refractive-diffractive surface is formed in the isotropic polymer 202. A UV curable liquid crystal polymer layer 214 may be added to the diffractive surface 212 as shown in FIG. 13b. The liquid crystal polymer takes up the alignment at the diffractive layer, and forms for example a homeotropic alignment at the opposite side substrate. Alternatively, as shown in FIG. 13c, a Microsheet 204 with alignment layer 206 may be used. The alignment layer 206 can be rubbed polyimide for example, or a photo-alignment layer or may be an embossed isotropic polymer.

The Microsheet 204 may be replaced for example by a plane shim with the diffractive alignment structure. The liquid crystal polymer is cured on the shim and takes up the diffractive alignment structure, after which the shim is removed to produce a free standing liquid crystal layer with appropriate orientation. The layer can be attached to the appropriate substrate with the use of an isotropic adhesive.

In a further aspect of the present invention, a biconvex lens is formed in the birefringent material to advantageously allow a shorter back working distance for the lens. The biconvex lens may comprise at least one diffractive alignment layer.

Advantageously, the shim may have an additional surface curvature and diffractive alignment, so as to produce a biconvex lens structure as shown in FIG. 15 for example. In FIG. 15a the isotropic lens structure is formed as shown in FIG. 13a. A UV curable LC material 214 is introduced between the isotropic material 202 and a shim 216 comprising a diffractive alignment pattern and optional lens microstructure. The shim may be reflective, so that the alignment of the shim with respect to the structure of the lens 202 may be achieved by optical alignment for example by imaging the Moire pattern generated by illuminating through the first lens 202 and collecting the reflected light. On release of the shim 216, a biconvex aligned birefringent lens 218 can be produced as shown in FIG. 15b. As shown in FIG. 15c, the lens may be attached to the display counter substrate 132 for example by means of an isotropic material 220 of refractive index substantially the same as the ordinary index of the birefringent material for example.

Biconvex lenses are particularly of value for high resolution systems, or systems with a large number of views in which the curvature of the lens cannot be made sufficiently small for the available materials in order to achieve the desired focal length. Additionally, the curvature of the two surfaces, and material choices for the two isotropic layers 202, 220 and birefringent layer 214 may be chosen to minimise the transverse chromatic aberration at the pixel plane. In particular, materials 202 and 220 may have different refractive indeces and dispersions.

Figure 15A:
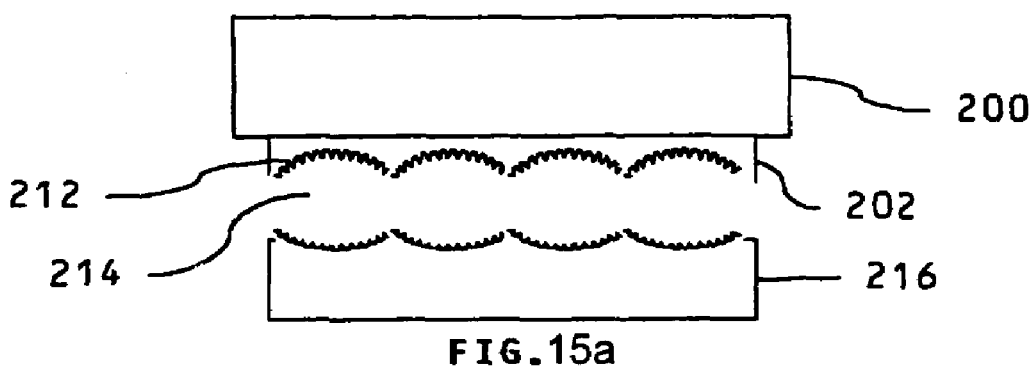
FIG. 15a shows the formation of a biconvex liquid crystal lens using a replication tool with the liquid crystal material.
Figure 15B:
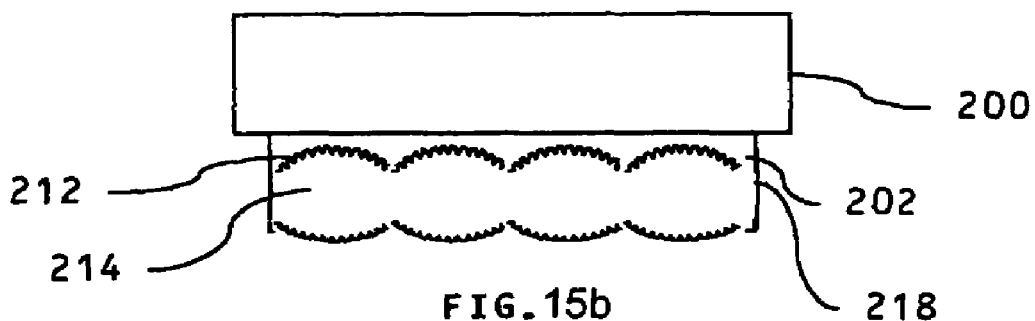
Figure 15C:
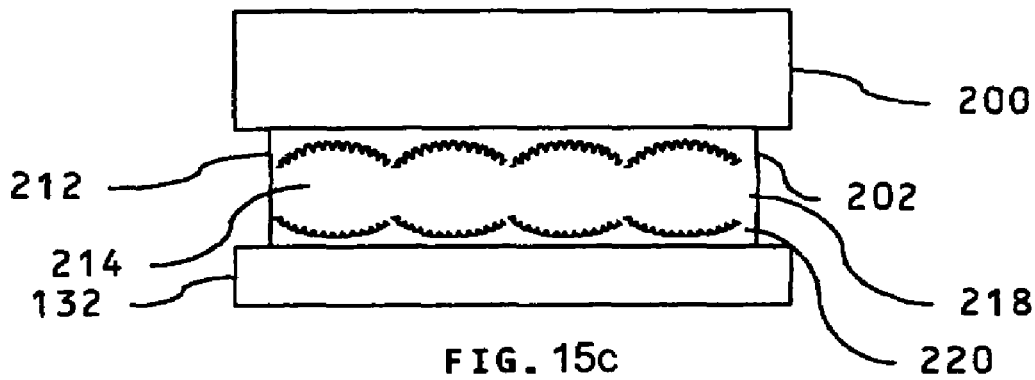
FIG. 15c shows the attachment of the biconvex liquid crystal lens of FIG. 15b to the display substrate.
Figure 15D:
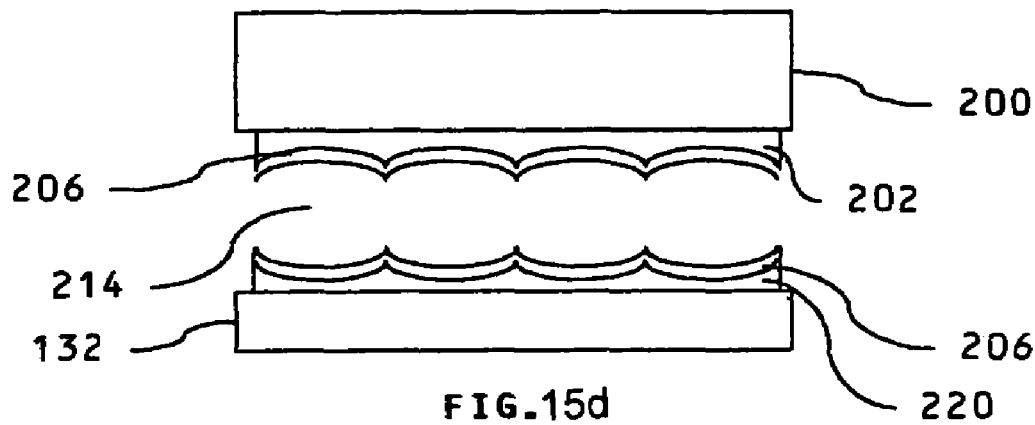
FIG. 15d shows the formation of a biconvex birefringent lens using non-diffractive alignment microstructure.

The biconvex lens may alternatively be formed between two surface relief surfaces, as shown in FIG. 15d for example.

Figure 16:
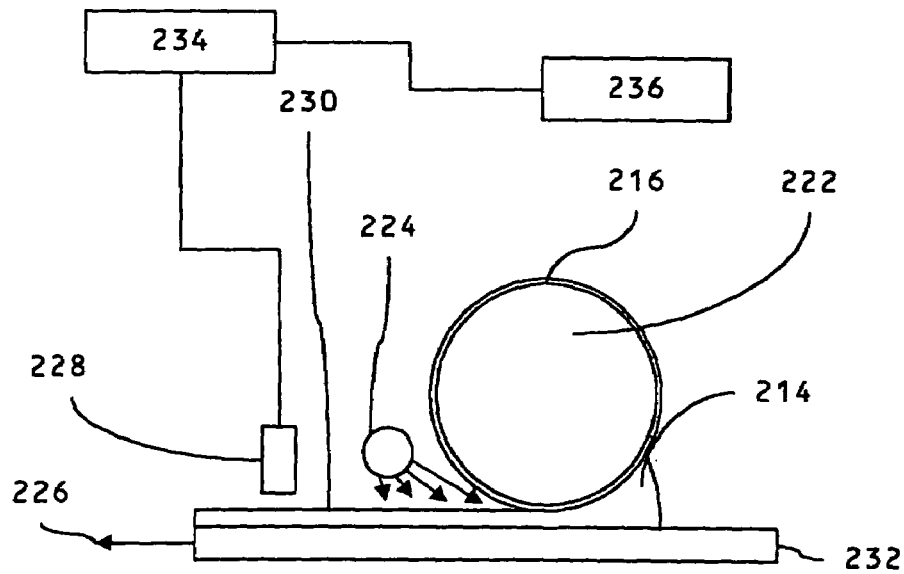
FIG. 16 shows an apparatus for replication of liquid crystal polymer structures.

FIG. 16 shows one example of an apparatus to generate each of the replicated cured surfaces of this aspect of the invention. A shim 216 is wrapped around a drum 222 and a substrate comprising an appropriate optical stack 232 is passed under the rotating drum in a direction 226. A pool of curable liquid crystal material 214 is fed on top of the substrate 232 and cured by a UV lamp 224. The cured substrate 230 is examined by an optical inspection tool 228 which determines that the correct alignment of the tool 216 with respect to the base substrate 232 has been achieved. An error signal is sent to a positioning controller 234 which corrects for position errors the control of the tool 216 or substrate 232 by means of a mechanical position actuator 236.

The use of diffractive alignment microstructures in the embodiments of the invention described above avoids the need for additional alignment layers to align the birefringent material forming the lens. The diffractive microstructures may be formed only in the birefringent material. As the lens structure does not have to be replicated in the isotropic material, the release properties of the isotropic material do not have to be well controlled, as the microstructure is only formed in the birefringent material. This can allow more choice of materials to match the refractive index matching condition. For example, the isotropic material may be a gel material. A biconvex lens can be conveniently produced with a shorter back working distance and thus can be used with higher resolution panels, and produce more viewing windows. A combination of isotropic materials can be used to optimise the dispersion characteristics of the lens, so improving the chromatic aberration performance. The biconvex lens can be formed on a single substrate, and so is easier to handle in manufacturing and does not require additional thin substrates.

Surface Reflection Reduction

Figure 17:
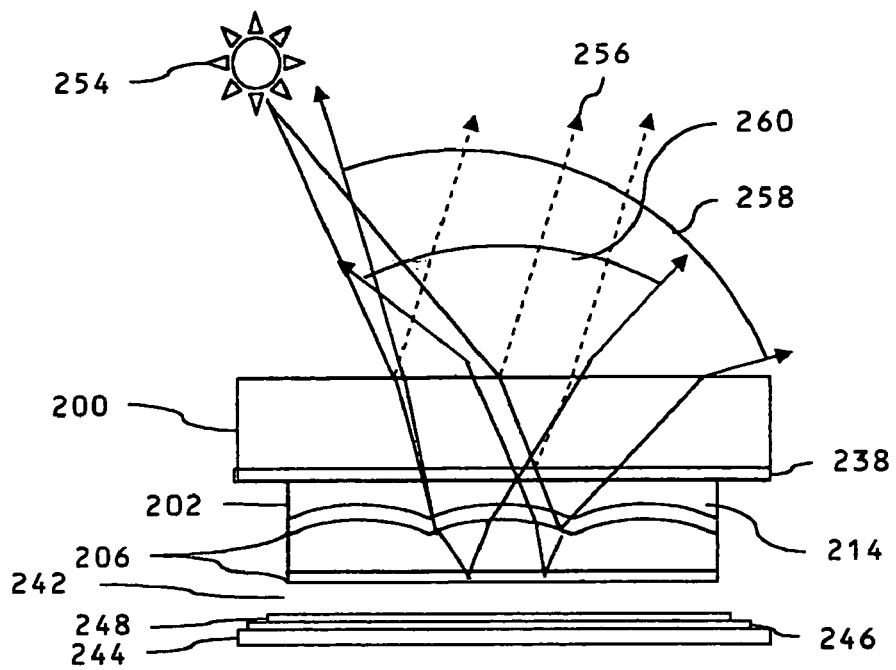
FIG. 17 shows the reflection of ambient light at the lens interface.

In operation, conventional lens arrays will generally have a surface reflectivity which is defined by the Fresnel reflectivity coefficients. The reflectivity of a lens surface in air is approximately 4%, whereas the reflectivity of a typical birefringent lens is approximately 0.5%, depending on material choices. However, in brightly lit environments, even small lens reflectivities may be disturbing due to the diffusion caused by the surface profile, as shown in FIG. 17. An external light source 254 illuminates the front surface of a device similar to that shown in FIG. 13, except that non-diffractive alignment structures are employed. A specular reflection 256 is produced by planar surfaces above the lens, while the lens surface produces a cone 258 of reflected light rays from the lens surface. Light focused by the lens produces a cone 260 of diffuse light when reflected from planar surfaces.

This may cause some diffusion of the specular image of external light sources and may thus be distracting to users in brightly lit environments. This may be of particular concern in displays operating in enhanced reflective mode which operate in cooperation with external light sources. In normal operation, users are accustomed to moving the specular reflection away from their field of vision by tilting the display for example. In the 2D (or non enhanced reflection) mode of operation, the lenses are substantially index matched to the isotropic material and thus there is no refractive index step at the lens surface. Therefore there is no Fresnel reflection in the 2D mode. However, in the 3D mode, the lenses do have a refractive index step in one polarisation state, and thus a Fresnel reflection occurs. This causes a diffuse image of the light source in a fan of directions which is different from the specular and more difficult for the observer to avoid in operation.

Figure 18:
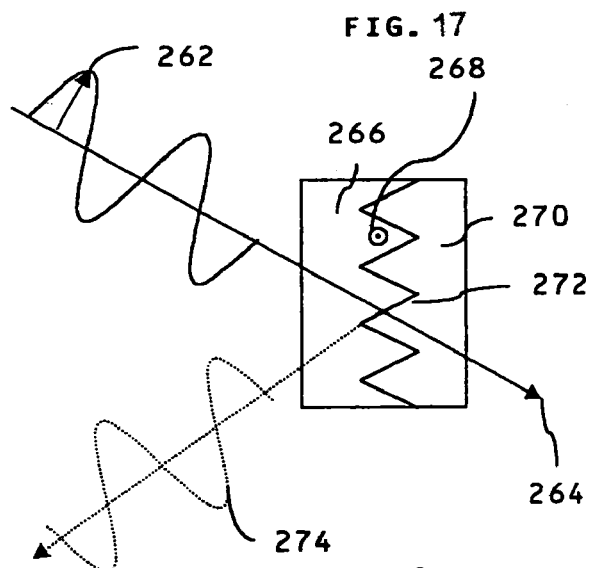
FIG. 18 shows the a diffractive alignment microstructure with anti-reflection properties.

FIG. 18 shows that the diffractive alignment microstructures may also incorporate an anti-reflection effect. An input light ray propagating in direction 264 with polarisation direction 262 is incident on a diffractive microstructure 272, with grooves extending out of the plane of the paper, at the boundary between a birefringent material 266 with birefringent optical axis direction 268 parallel to the linear diffraction structure and an isotropic material 270. Due to the phase step at the microstructure 272, there would be a reflected beam 274. However, because of the relative size of the diffractive structure compared to the wavelength of the light, a reduced reflectivity is seen at the microstructure 272 in a similar manner to the moth-eye effect.

Thus, a one dimensional moth-eye effect may be incorporated, and of particular advantage, this may be the same structure as required to form diffractive alignment. In order for this structure to operate in the lensing mode of operation, the polarisation state must be in the plane of incidence, and thus the ordinary index of the liquid crystal material should be different from the index of the isotropic material, while the extraordinary refractive index should match the index of the isotropic material.

In this way, the diffractive alignment features may also incorporate anti-reflective feature for operation in the optically powered mode of operation (e.g. 3D or enhanced reflectivity). The anti-reflective feature may be present at optically powered surfaces, or plane surfaces of the birefringent lens.

Figure 19:
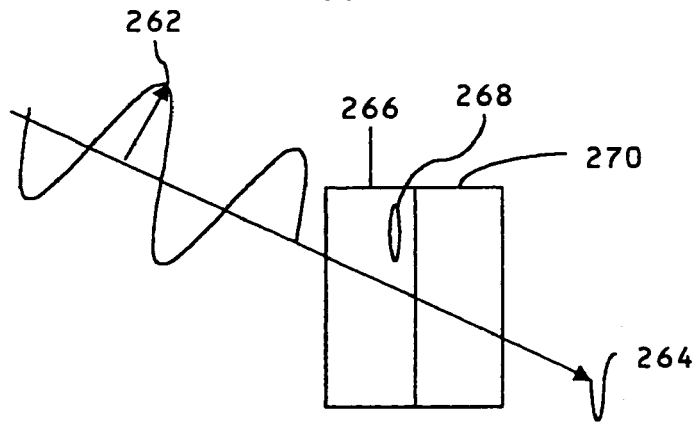
FIG. 19 shows the output for the orthogonal polarisation state of FIG. 18.

In the second mode of operation, as shown in FIG. 19, the incident polarisation state is orthogonal to the grating and thus no grating is seen. Thus, no anti-reflection property is present. However, as the surfaces are index matched, no anti-reflection property is required.

The diffraction grating can be of pitch sufficiently small that no visible diffraction pattern is produced by the grating due to the high deflection angle.

In this way, passive birefringent lens elements with anti-reflection properties can be fabricated in single replication steps without the need for subsequent surface processing. This advantageously reduces the cost and increases the yield of the process. The diffractive alignment anti-reflection properties reduce the lens visibility in brightly lit environments, with minimal cost.

In the embodiments described above the alignment microstructure between the first birefringent material and the second birefringent material is a diffractive microstructure, but it may be of an alternative form, for example being: an additional layer, such as a rubbed layer of polyimide or other polymer; or a structured dipole field formed in the surface of the first birefringent material; or any combination of different types of microstructure. In this case, the alignment microstructure may comprise a surface relief formed in the surface of a polyimide from the action of the rubbing cloth; or a microstructured dipole field caused by the microstructured realignment of polyimide dipoles; or a combination of microstructured surface relief and microstructured dipole field.

FIG. 20 illustrate the manufacture of an embodiment in which the alignment microstructure between the first birefringent material and the second birefringent material is a rubbed polyimide layer. First, an isotropic lens array 202 was formed in UV cured NOA71 on a glass substrate 200 using a nickel shim as shown in FIG. 20a. An RN-1340 polyimide alignment layer 300 was spin coated on the surface of the lens 202 and baked. The polyimide coated isotropic lens surface 202, 300 was rubbed using a rubbing cloth. A sacrificial plane glass substrate 304 was also spin coated with a polyimide layer 302 of RN-1340 and rubbed to form an alignment microstructure.

Figure 20A:
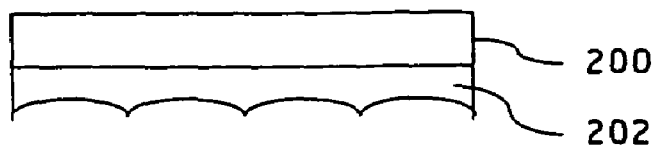
FIG. 20a shows the formation of an isotropic lens structure.
Figure 20B:
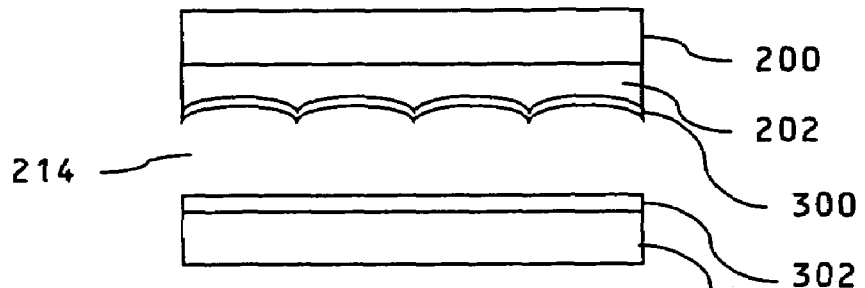
FIG. 20b shows the formation of a curable liquid crystal layer with a sacrificial substrate.
Figure 20C:
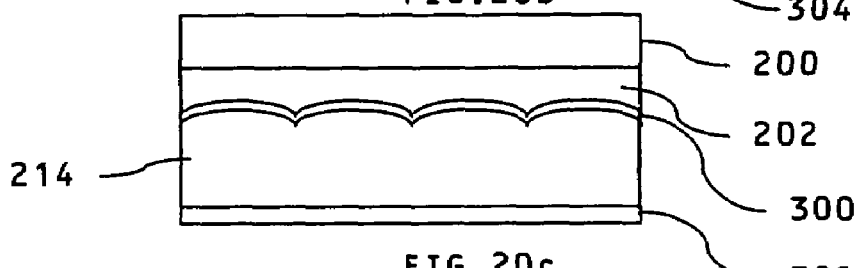
FIG. 20c shows the cured birefringent lens incorporating a polyimide alignment microstructure following removal of the sacrificial substrate.

A liquid crystal cell was assembled as shown in FIG. 20b using the two substrates 200, 202, 300 and 302, 304 and filled with RM257, 214 at a temperature of 85° C. The liquid crystal material was cured in UV light so that a solid birefringent lens element was formed. As shown in FIG. 20c, the sacrificial plane substrate 304 was then separated from the lens by applying mechanical force between the sacrificial substrate 304 and solid lens component. The polyimide layer 302 remains attached to the cured liquid crystal material 214.

Figure 20D:
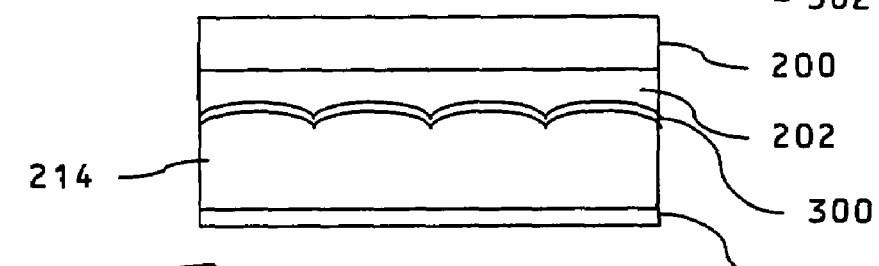
FIG. 20d shows the assembly of a switch cell using the cured birefringent lens with polyimide alignment microstructure and a plane substrate.

A glass substrate 308 had a rubbed polyimide alignment layer 306 formed on its surface. As shown in FIG. 20d, a liquid crystal cell was formed between the polyimide surface 302 of the detached lens component and the rubbed polyimide alignment layer 306 of the glass substrate 308. This cell was filled with nematic phase liquid crystal material 242, such as E7 from Merck. The cell demonstrated alignment of the nematic phase material. In this way, the alignment microstructure 302 used to form the lens element was also used to align the switch cell element.

The polyimide alignment layer 306 may also be rubbed following the removal of the alignment layer from the sacrificial substrate. Such rubbing may advantageously modify the alignment properties of the microstructured alignment, thus improving the alignment of the nematic phase material. Rubbing of the alignment layer is a relatively low cost process compared to adding a further spin coated polyimide layer.

In operation, further ITO layers would be applied so that a field may be applied across the nematic phase material. This therefore allows conventional alignment layer materials to be used to form the cured birefringent material of the lens, with the common function of aligning a nematic phase switch cell. This provides the unexpected combination of advantages of using well understood properties of polyimide alignment layers to align both liquid crystal layers; the birefringent lens does not have to be further processed after its formation, which reduces cost; additional alignment substrates are not required so that the switch cell can be conveniently formed close to the birefringent lens which reduces nominal display viewing distance, device thickness and weight.

Figure 20E:
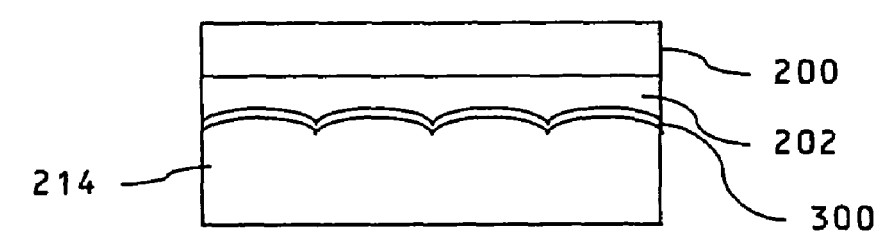
FIG. 20e shows a cured birefringent lens and switch cell incorporating a alignment microstructure formed in the cured birefringent material by a polyimide layer which has been removed together with the sacrificial substrate.

In another example, the alignment microstructure may comprise the microstructured surface of a cured liquid crystal polymer in which alignment was achieved by means of a rubbed polyimide layer. Thus the molecules of the birefringent material have a microstructure, which may be a microstructured surface relief, or microstructured dipole alignment. As an example of this, a cured liquid crystal lens was formed as described above with reference to FIG. 20, but with modifications as follows. With regards to FIG. 20b, on detachment of the lens 200, 202, 300, 214 from the sacrificial substrate 304, the polyimide material 302 was removed with the plane substrate 304, so the nematic phase cell was assembled with the cured liquid crystal material 214 comprising one side of the cell as shown in FIG. 20e. The polyimide material 302 leaves the exposed surface of the cured liquid crystal material 204 with an alignment microstructure in the form of a dipole field. This alignment microstructure serves to align the liquid crystal material 242 in the nematic phase switch cell.

In further embodiments, the microstructured alignment may be formed by means of photoaligned polymers. Device assembly may take place using a similar method to that described above.

Optionally, the birefringent material may be provided with a further microstructured alignment layer such as rubbed polyimide, replicated surface relief, or photo-aligned layer to suit the alignment direction and pre-tilt requirements of the switch cell.

As all of the embodiments described above, tilted lenses may be used to increase the number of viewing windows produced by the display as well known in the art. Advantageously, the output polarisation of the display may be set to be the same as the tilt of the lenses. This results in the lenses not having to rotate the output polarisation state from the display. Therefore, the lens thickness may advantageously be reduced, as no guiding of the polarisation state is required in the region of the cusps of the lenses.

This invention is particularly advantageous for high resolution switchable 2D/3D display devices. First, the switch element is preferably positioned between the pixel plane and the lens element, allowing increased device contrast. A switchable two view lenticular display based on a panel with 25 μm×75 μm pixel pitch operating in landscape mode has lenses on a pitch of substantially 150 μm. To achieve a nominal viewing distance of 400 mm for 65 mm window width, a total lens to panel separation of 700 μm is required. Typical LCDs have counter substrate glass thickness of 500 um, so that the substrate thickness of the lens component is required to be 200 μm. If the structure is required to have additional substrates, such a total lens substrate thickness will be difficult to achieve. Thus, the structures of this invention advantageously allow thin devices to be configured to meet the viewing distance requirements of high resolution display panels.

The invention claimed is:

1. A lens structure for a directional display apparatus, comprising: a birefringent lens array capable of directing light of a given polarisation into a directional distribution; a switchable liquid crystal layer capable of rotating the polarisation of light passing therethrough; a pair of electrodes for applying an electric field to switch the liquid crystal layer, the electrodes being arranged with both the birefringent lens array and the switchable liquid crystal layer therebetween, the material of the birefringent lens array having an electrically conductive material incorporated therein.

2. A lens structure according to claim 1, wherein the conductive material is a conductive polymer.

* * * * *